US008821275B2

(12) United States Patent  (10) Patent No.: US 8,821,275 B2
Apirian et al.  (45) Date of Patent:  Sep. 2, 2014

(54) WAGERING GAME, GAMING MACHINE, GAMING SYSTEM AND METHOD WITH SLOW MOTION REPLAY

(75) Inventors: David J. Apirian, Austin, TX (US); Keith Riggs, Austin, TX (US); Paul Klingensmith, Austin, TX (US); Brandon Fish, Austin, TX (US); Steven Meyer, Austin, TX (US); Clint Owen, Austin, TX (US); JP Cody, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 224 days.

(21) Appl. No.: 13/237,913

(22) Filed: Sep. 20, 2011

(65)  Prior Publication Data

US 2012/0077588 A1   Mar. 29, 2012

Related U.S. Application Data

(60) Provisional application No. 61/386,367, filed on Sep. 24, 2010.

(51) Int. Cl.
*A63F 13/00*   (2014.01)

(52) U.S. Cl.
CPC ........... *A63F 13/00* (2013.01); *A63F 2300/634* (2013.01)
USPC .......................................................... 463/31

(58) Field of Classification Search
CPC ................ A63F 13/00; A63F 2300/69; A63F 2300/634; A63F 2300/6036
USPC .......................................................... 463/31
See application file for complete search history.

(56)  References Cited

U.S. PATENT DOCUMENTS

| 4,342,454 | A | * | 8/1982 | Baer et al. ........................ 463/31 |
| 5,740,333 | A | * | 4/1998 | Yoh et al. ........................ 358/1.9 |
| 5,782,672 | A | * | 7/1998 | Woodley ........................... 450/57 |
| 6,699,127 | B1 | * | 3/2004 | Lobb et al. ...................... 463/43 |
| 2002/0080162 | A1 | * | 6/2002 | Pan et al. ........................ 345/723 |
| 2005/0271294 | A1 | * | 12/2005 | Takahashi ...................... 382/272 |
| 2010/0137047 | A1 | * | 6/2010 | Englman et al. .................. 463/6 |
| 2010/0271367 | A1 | * | 10/2010 | Vaden et al. ................... 345/420 |

* cited by examiner

*Primary Examiner* — David L Lewis
*Assistant Examiner* — Shauna-Kay Hall
(74) *Attorney, Agent, or Firm* — Nathan H. Calvert, Esq.; Russell D. Culbertson, Esq.; JP Cody, Esq.

(57)  ABSTRACT

A wagering game, gaming machine, networked gaming system, and associated methods are disclosed including a bank of gaming machines connected to an overhead display enabling players at the respective gaming machines to qualify to play a community feature game displayed on the overhead display wherein each qualified player may view a slow motion finish and/or replay including a flash photograph-effect.

16 Claims, 23 Drawing Sheets

US 8,821,275 B2

WAGERING GAME, GAMING MACHINE, GAMING SYSTEM AND METHOD WITH SLOW MOTION REPLAY

COPYRIGHT NOTICE

A portion of the disclosure of this patent document contains material which is subject to copyright protection. The copyright owner has no objection to the facsimile reproduction of the patent document or the patent disclosure as it appears in the U.S. Patent and Trademark Office patent files or records, but otherwise reserves all rights of copyright whatsoever.

CROSS-REFERENCE TO RELATED APPLICATION

The Applicants claim the benefit, under 35 U.S.C. §119(e), of U.S. Provisional Patent Application No. 61/386,367 filed Sep. 24, 2010, and entitled "Wagering Game, Gaming Machine, Gaming System And Method With Slow Motion Replay." The entire content of this provisional application is incorporated herein by this reference.

BACKGROUND OF THE INVENTION

1. Field of the Invention

This invention relates to wagering games, gaming machines, gaming systems, and associated methods. More particularly, the invention relates to gaming machines and related methods presenting wagering games together with either, a community or stand-alone feature game with a slow motion replay effect.

2. Description of the Related Art

Various gaming systems have been developed to provide wagering games and community feature games. There continues to be a need for innovative methods and gaming systems presenting community and other feature games in different ways to generate player interest and excitement.

SUMMARY OF THE INVENTION

In accordance with an embodiment of the present invention, a wagering game is presented with a slow motion replay of an event, such as a game ending event. Examples of a game ending event may be the finish of a race or a winning combination, particularly when a large win or special event occurs. Example special events may be a progressive or major jackpot win or a bonus triggering event.

In accordance with another example embodiment, a community game is presented with a bank of gaming machines connected to an overhead display enabling players at the respective gaming machines to qualify to play a community feature game displayed on the overhead display. Each qualified player may be associated with a virtual competitor (also referred to herein as a "virtual participant") such as a car upon which the player has placed a bet, and the finish of the feature game is re-played in slow motion. The slow motion replay may also include a flash effect simulating a flash photograph and temporarily holding the display frame as one or more game competitors complete the game, such as cross a finish line.

The invention also encompasses program products comprising program code which may be executed by suitable processing devices. In one embodiment a program product includes feature game administration program code and feature game presentation program code. The feature game administration program code may be executable to initiate play of a feature game, to provide a player the opportunity to select at least one virtual participant from a field of virtual participants of the feature game, and to determine or receive an outcome for the feature game. The feature game presentation program code may be executable to produce a competition graphic signal and a slow motion replay graphic signal to drive one or more display devices to present the feature game to the player via a competition graphic and then a slow motion replay graphic. The competition graphic shows a virtual competition between the field of virtual participants. The slow motion replay graphic shows a segment of the virtual competition in slow motion.

These and other advantages and features of the invention will be apparent from the following description of illustrative embodiments, considered along with the accompanying drawings.

DESCRIPTION OF ILLUSTRATIVE EMBODIMENTS

Figure 1:
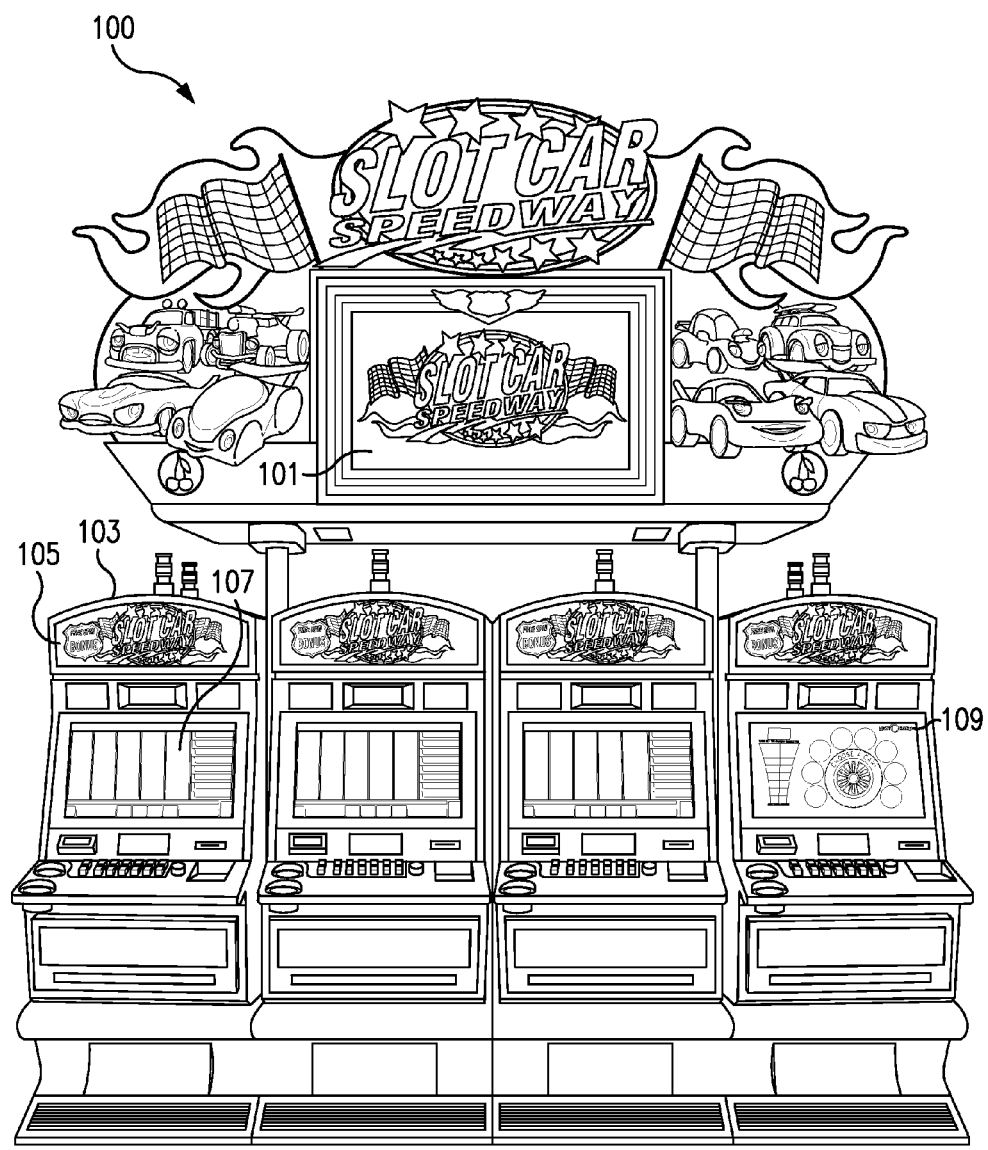
FIG. 1 illustrates an example community feature game bank with an overhead display in accordance with one or more embodiments.

Referring to FIG. 1, example gaming system 100 is shown with overhead display (shared display) 101 connected to a bank of networked gaming machines 103 such that a community feature game may be presented on overhead display 101 and individual awards may be provided based on corresponding community feature game events in accordance with one or more embodiments.

In one or more embodiments, each of the players on the bank may qualify to play the community game based upon one or more criterion, such as by playing the primary game at the gaming machine and achieving one or more milestones, such as accumulating one or more betting tickets and/or meeting a minimum wager and frequency at the time of the community game being triggered. Each gaming machine 103 on the bank may connect to a master community feature game controller to receive community game status information and transmit player status information, and may include a display which may provide player status information and community game status information. For example, display 107 may show eligibility timer 109, such as a clock-style countdown with a tick indicator (e.g. ticking down a timer to zero). Player eligibility may be based on initiating each game play within a pre-specified period (e.g. eight seconds) and playing a pre-specified minimum number of lines (e.g. thirty or maximum lines) with at least one credit wagered per line plus a community game side bet (e.g. twenty credits).

Figure 19:
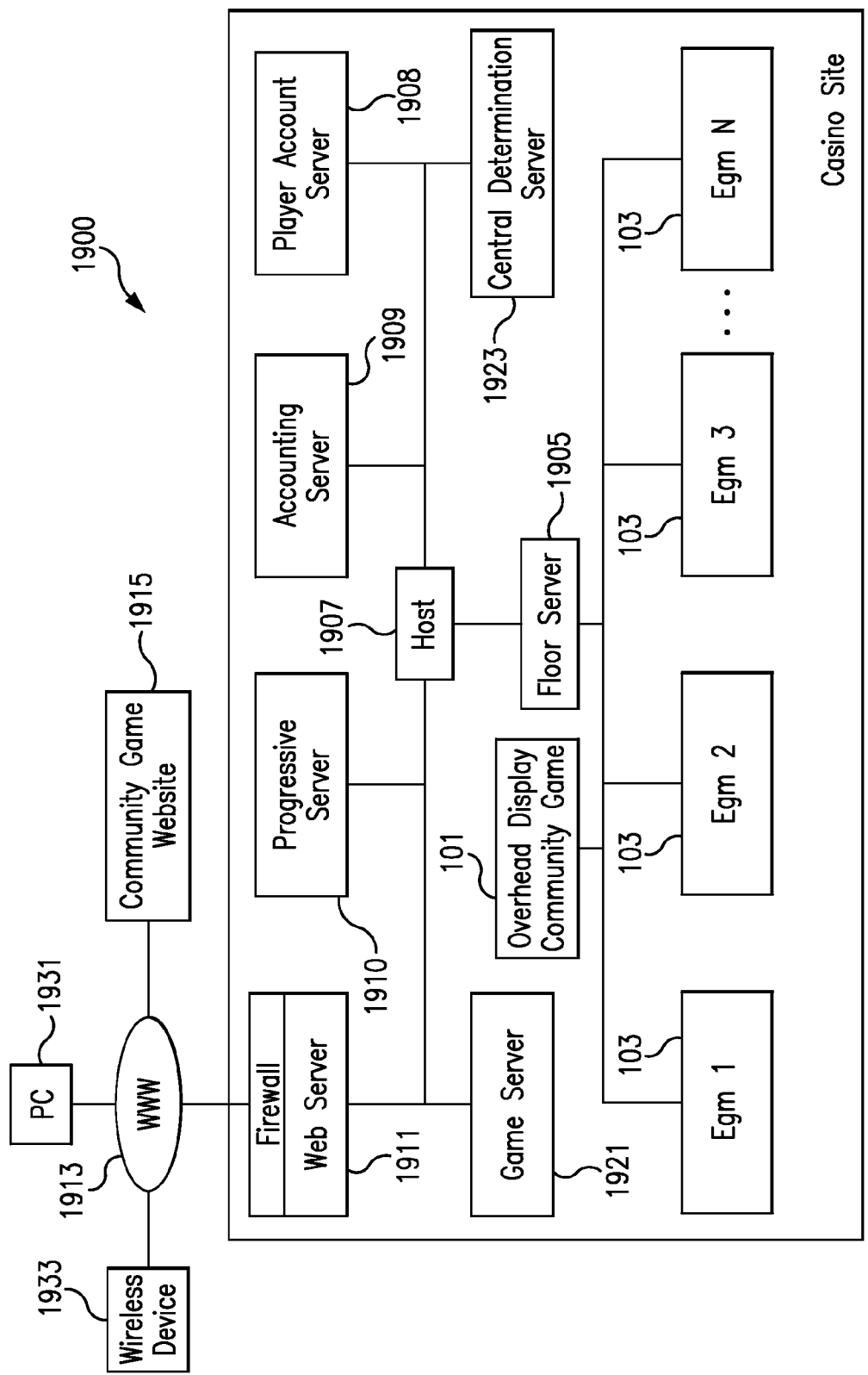
FIG. 19 illustrates an example gaming network associated with one or more gaming facilities and which includes a community game system with an overhead display operably connected to a designated bank of gaming machines to provide a community feature game in accordance with one or more embodiments.

In one or more embodiments, the community feature game may be triggered by an event at one or more of the gaming machines or by any other event within the network, such as through a processor periodically determining whether to initiate the community feature game. Such a periodic determination may, for example, include use of a random number generator (RNG), a timer, or a counter by a processor to trigger the community feature game. In an example embodiment, a controller for overhead display 101 may include coding to periodically, such as each tenth of a second, initiate a selection using an RNG and determine whether the selection triggers a community feature game. Alternatively to using the overhead display controller, one of gaming machines 103 may be designated as the community feature game host and perform the controller operation described above to determine triggering the community feature game. In yet another alternative, the community feature game triggering determination may be conducted by a remote server connected to the bank and overhead display through a network (such as depicted in FIG. 19). Once the triggering event occurs and just prior to initiating the community feature game, a signal (an interrupt signal) may be sent by the community feature game controller to each of gaming machines 103 resulting in each game processor: i) storing a snapshot of its associated registers indicating the respective player's eligibility, and ii) transmitting eligibility information to the community feature game controller. Each gaming machine may also communicate a ready signal to the community game feature controller to indicate that the respective gaming machine is performed the necessary steps preparatory to starting the feature game and is thus ready to start the feature game.

In one or more embodiments, upon the determination to initiate the community feature game, an announcement may be transmitted to each of gaming machines 103 on the bank to advise the players of the impending beginning of the community feature game and possibly to encourage the players to engage in additional play to become eligible or to increase eligibility to play the community feature game. A visual and/or audible countdown may also be presented at each of the gaming machines in the bank, such as through display 107 and speakers on each gaming machine 103 and/or overhead display 101 (which may include speakers similar to various commercially available flat screen TVs), to further alert the players of the timing for the community feature game to begin.

In one or more embodiments, the community feature game may be displayed as a race track over which a set of cars may race. Prior to play of the game, each eligible player may have the opportunity (based on primary game play) to bet upon one or more race cars. Once the race is completed, one or more players may accrue points, credits, and/or awards based on their bets on their respective cars.

Figure 2:
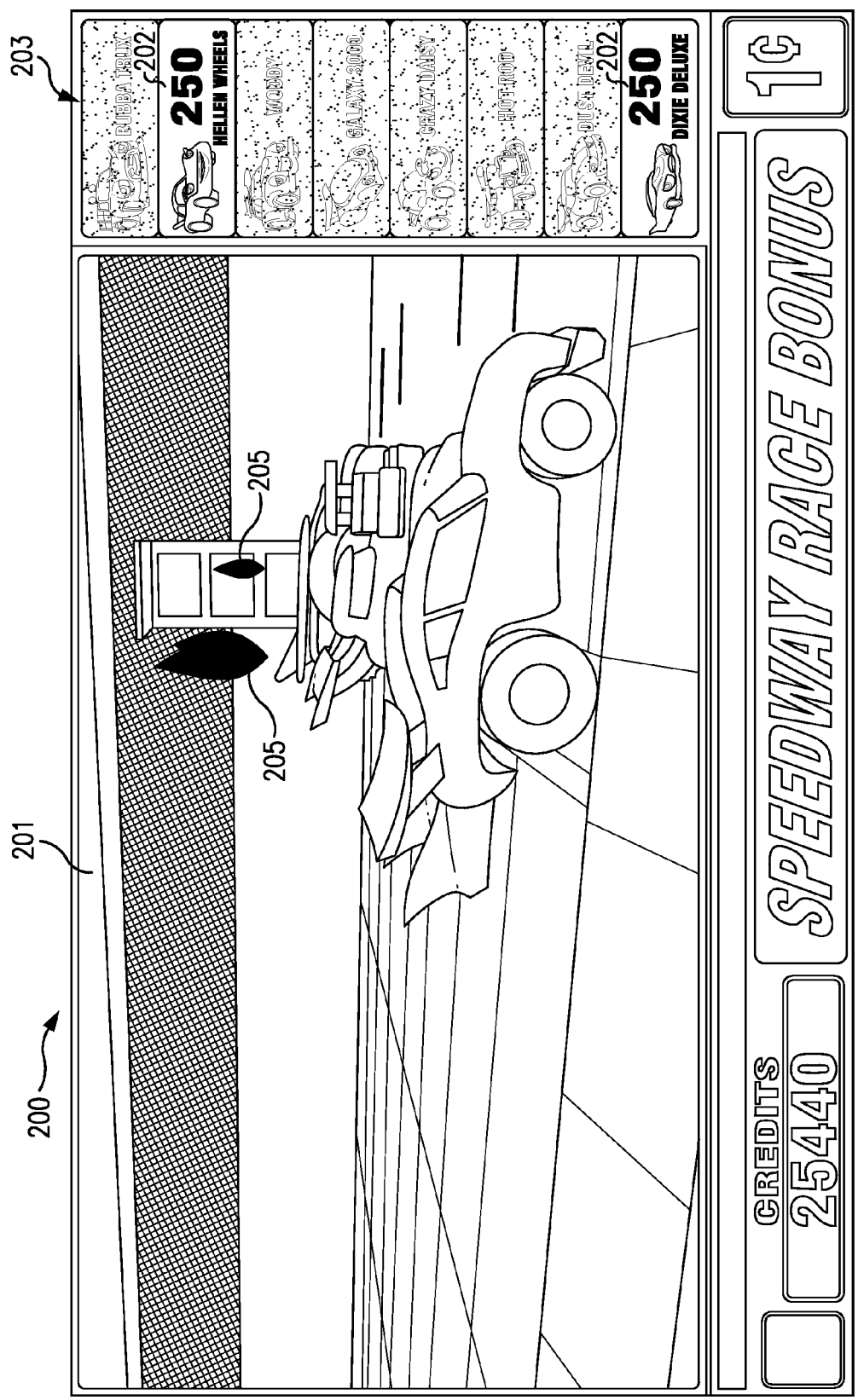
FIG. 2 illustrates an example community feature game with cars at the start line as shown on a player's display wherein a player's two race cars are shown in respective positions, and, as may similarly be shown on an overhead display in accordance with one or more embodiments.

Referring to FIG. 2, example screenshot 200 is shown of a community feature game with cars at the start line in display area 201 as may be shown on a player's display 107 (FIG. 1) wherein a player's two race cars are shown with highlighted markers 202 in respective positions on side display area 203 in accordance with one or more embodiments. Indicators 205 are also shown in display area 201 to indicate the player's two race cars. A similar screenshot may be displayed on overhead display 101 in which case each of the cars are shown highlighted in side display area 203, and without the indicators 205.

Figure 3:
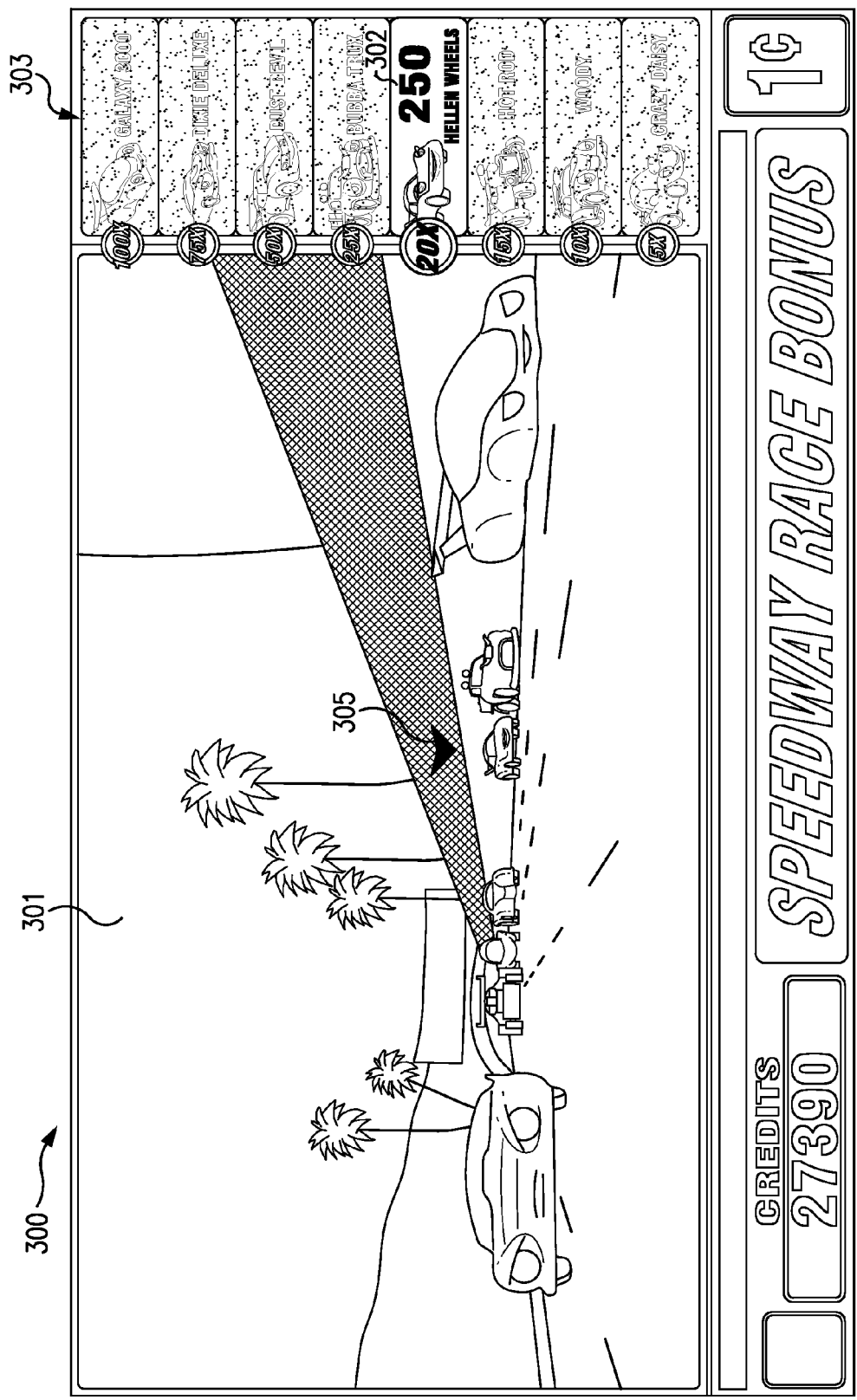
FIG. 3 illustrates an example community feature game with cars racing as shown on a player's display wherein a player's single race car is shown in its position both on the side leader board and with an indicator over the respective car, and, as may similarly be shown on an overhead display in accordance with one or more embodiments.

Referring to FIG. 3, example screenshot 300 is shown of a community feature game with cars racing in display area 301 as may be shown on a player's display 107 wherein a player's single race car marker is shown highlighted in its position both on a leader board presented in side display area 303 and with indicator 305 over the respective car, and, as may similarly be shown on overhead display 101 in accordance with one or more embodiments. As the race progresses, the player's single race car marker 302 on the leader board in area 303 may be displayed in sequence with the race display to skip around or over the markers of the other cars, either up or down, depending upon the player's car passing or being passed by the other cars. For display 101, the side display area corresponding to area 303 may highlight all the race car markers and show respective of the race car markers to skip around or over markers of the other cars as a position change occurs in the displayed race sequence.

Figure 4:
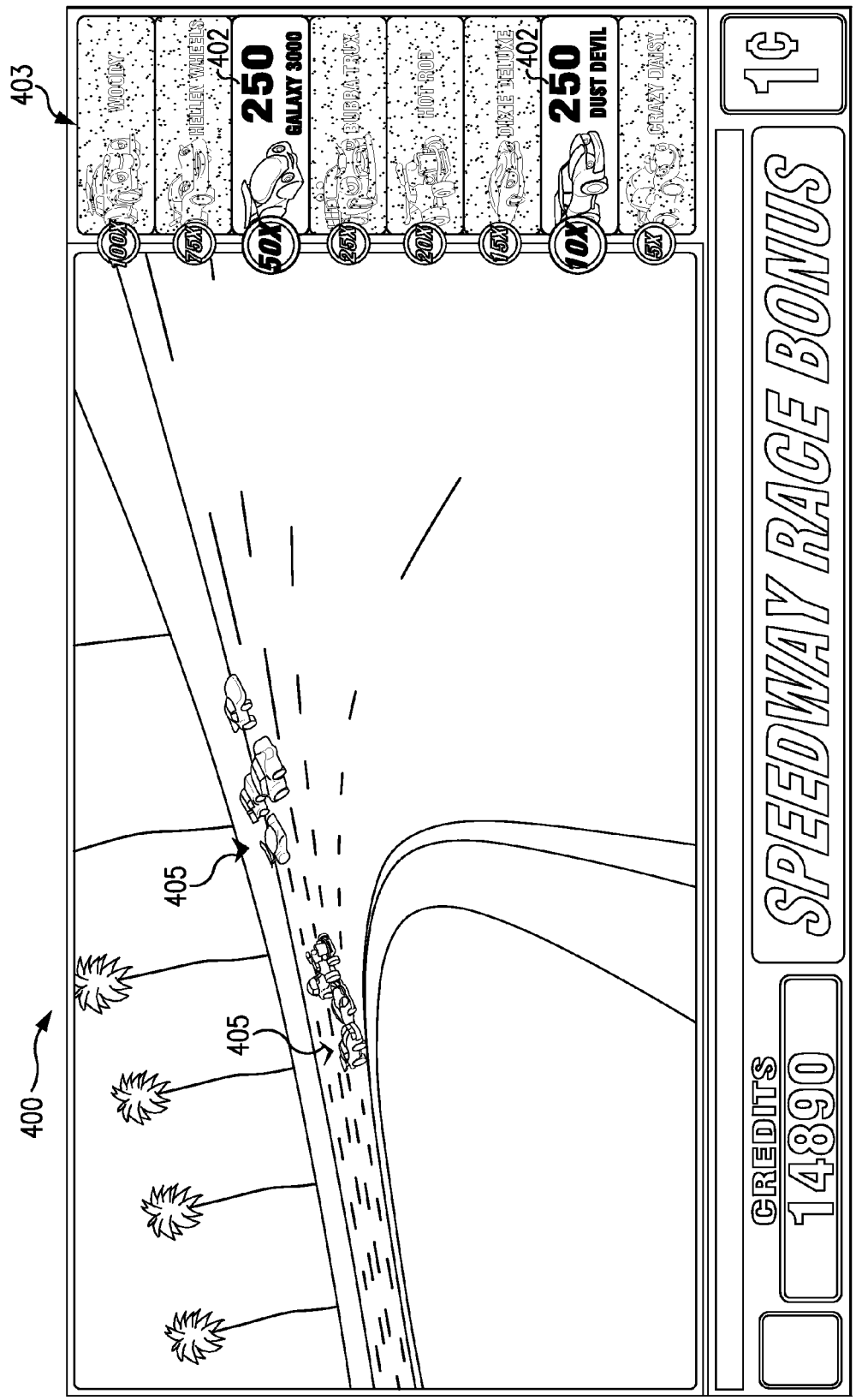
FIG. 4 illustrates an example community feature game with cars racing as shown on a player's display wherein a player's two race cars are shown in their respective positions both on the side leader board and with an indicator over the respective cars, and, as may similarly be shown on an overhead display in accordance with one or more embodiments.

Referring to FIG. 4, example screenshot 400 is shown of a community feature game with cars racing as shown on a player's display 107 (FIG. 1) wherein a player's two race cars are shown in their respective positions both on the leader board in side display area 403 (by highlighted markers 402) and with indicator 405 over the respective cars, and, as may similarly be shown on overhead display 101 in accordance with one or more embodiments. As the race progresses, both of the player's race car markers on the leader board in side display area 403 are displayed in sequence with the race display to skip around or over the markers of the other cars, either up or down, depending upon the player's car passing or being passed by the other cars.

Figure 5:
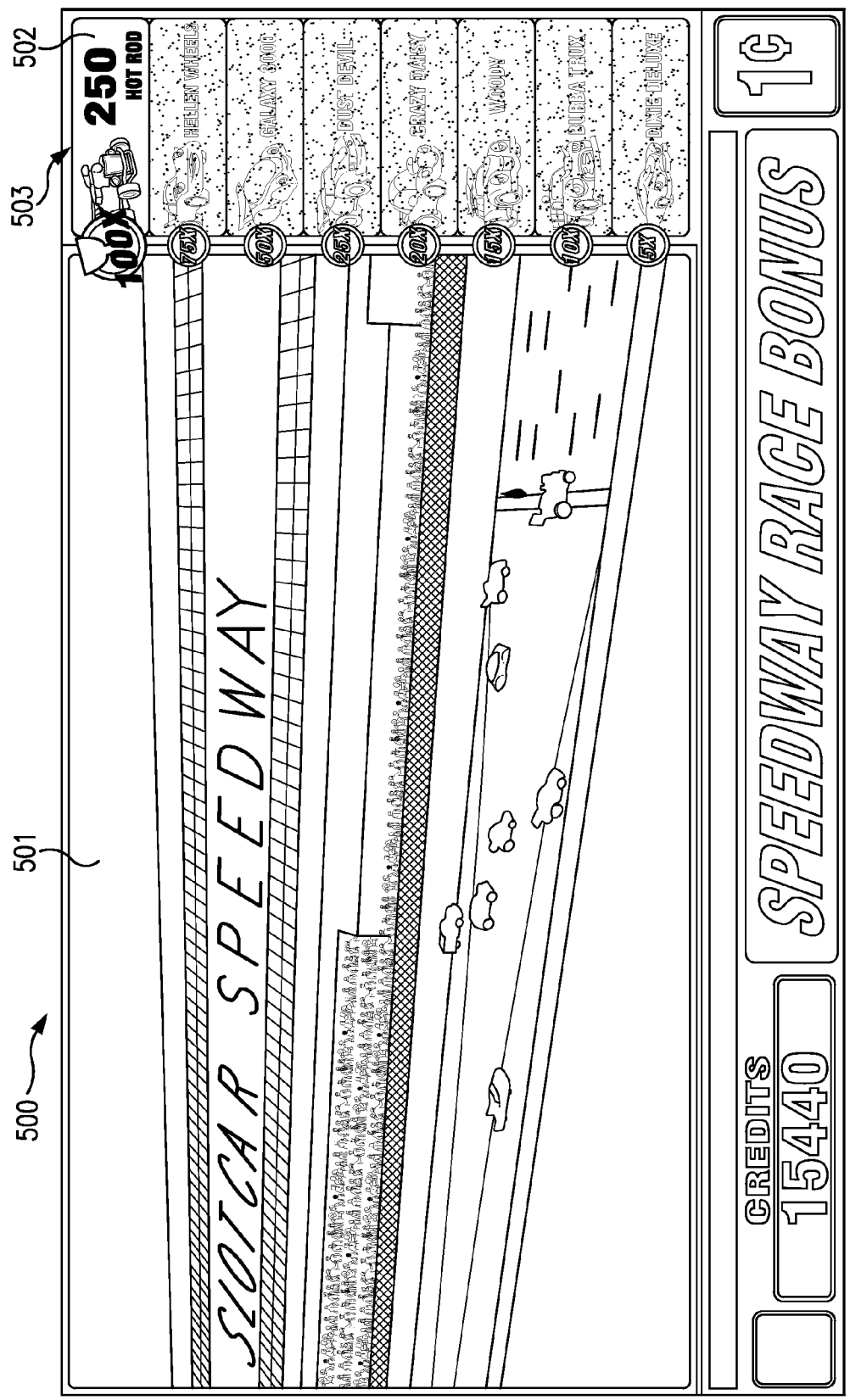
FIG. 5 illustrates an example community feature game with cars crossing finish line as shown on a player's display wherein a player's single race car is shown in its position both on the side leader board and with an indicator over the respective car, and, as may similarly be shown on an overhead display in accordance with one or more embodiments.

Referring to FIG. 5, example screenshot 500 is shown of a community feature game with cars crossing finish line in display area 501 as shown on a player's display 107 (FIG. 1) wherein a player's single race car is shown in its position both on the leader board shown in side display area 503 (shown with highlighted marker 502) and with indicator 505 over the respective car, and, as may similarly be shown on overhead display 101 in accordance with one or more embodiments. After the cars in the race bonus finish the race, the last stretch of the race may be replayed in slow motion. As the cars pass the finish line during the slow motion replay they briefly pause and the screen may be flashed to look similar to a camera flash. This effect may be achieved by using a combination of shader techniques producing both overexposure and saturation fading in and out quickly. The technique includes both pre and post processing. The post processing is a series of contrast filters, down and up sampling, and Gaussian blurs to achieve a variable Bloom effect which is used to overexpose the final image. These processes will be described further below in connection with FIG. 23.

Figure 6:
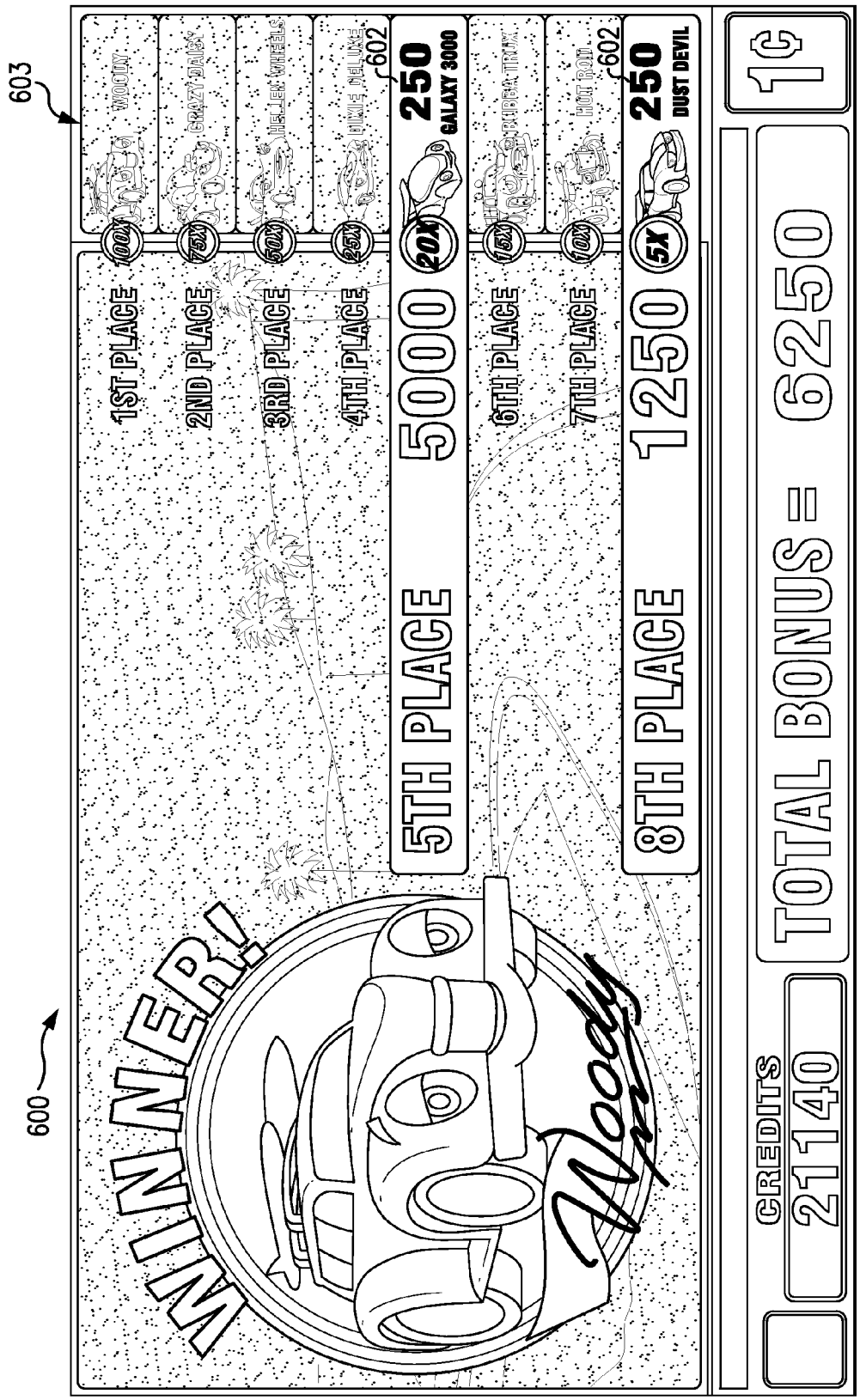
FIG. 6 illustrates an example community feature game with the winning car displayed as shown on a player's display and wherein a player's two race cars are shown in their respective positions on the side leader board along with the respective awards for the player, and, as may similarly be shown on an overhead display in accordance with one or more embodiments.

Referring to FIG. 6, example screenshot 600 is shown of a community feature game with the winning car displayed as shown on a player's display 107 (FIG. 1) and wherein a player's two race cars are shown in their respective positions (with highlighted and expanded markers 602) on the leader board in side display area 603 along with the respective awards for the player, and, as may similarly be shown on overhead display 101 in accordance with one or more embodiments.

Figure 7:
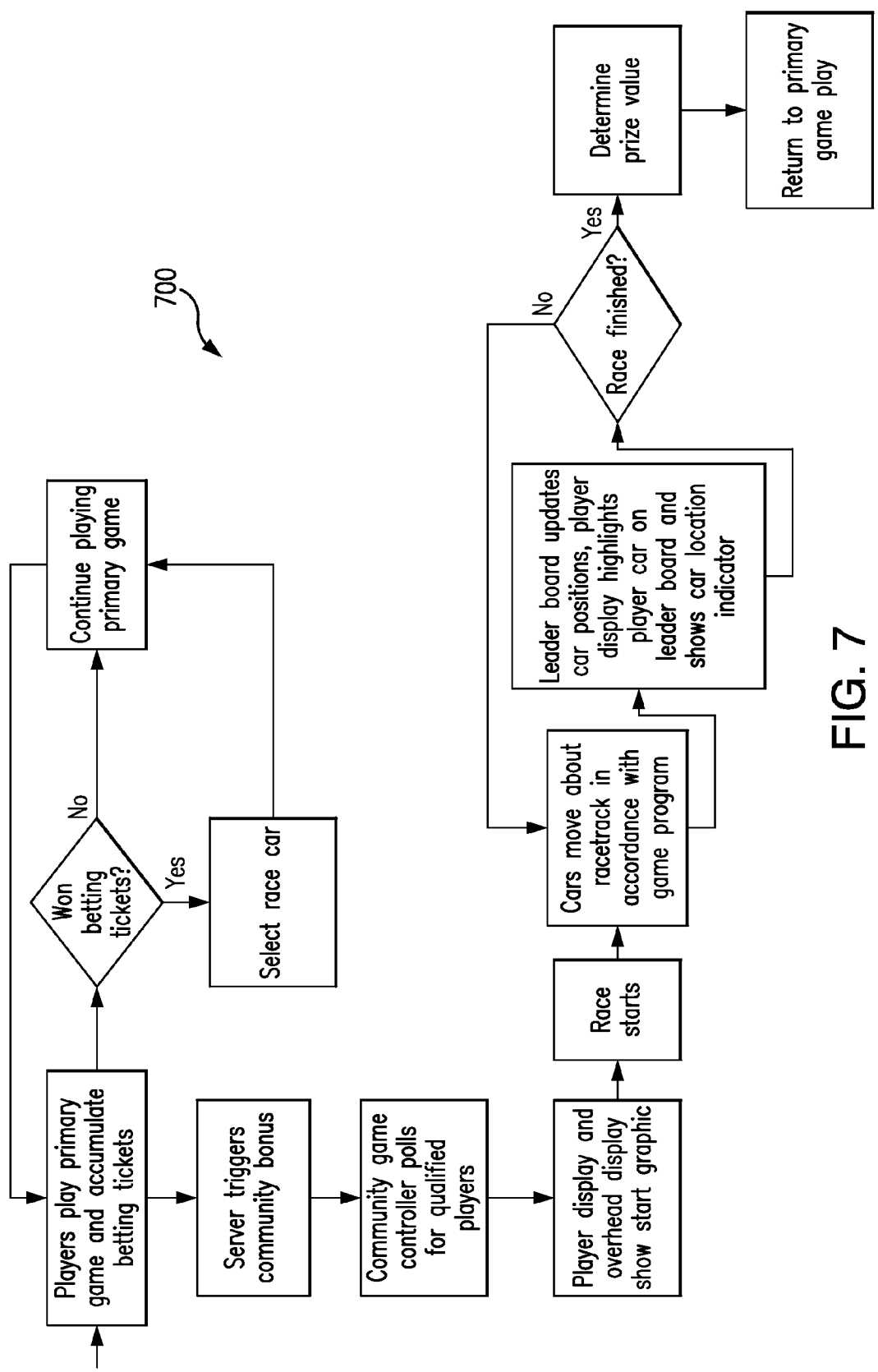
FIG. 7 illustrates an example flowchart of a community feature game in accordance with one or more embodiments.

Referring to FIG. 7, example flowchart 700 of a community game is shown in accordance with one or more embodiments.

Figure 8:
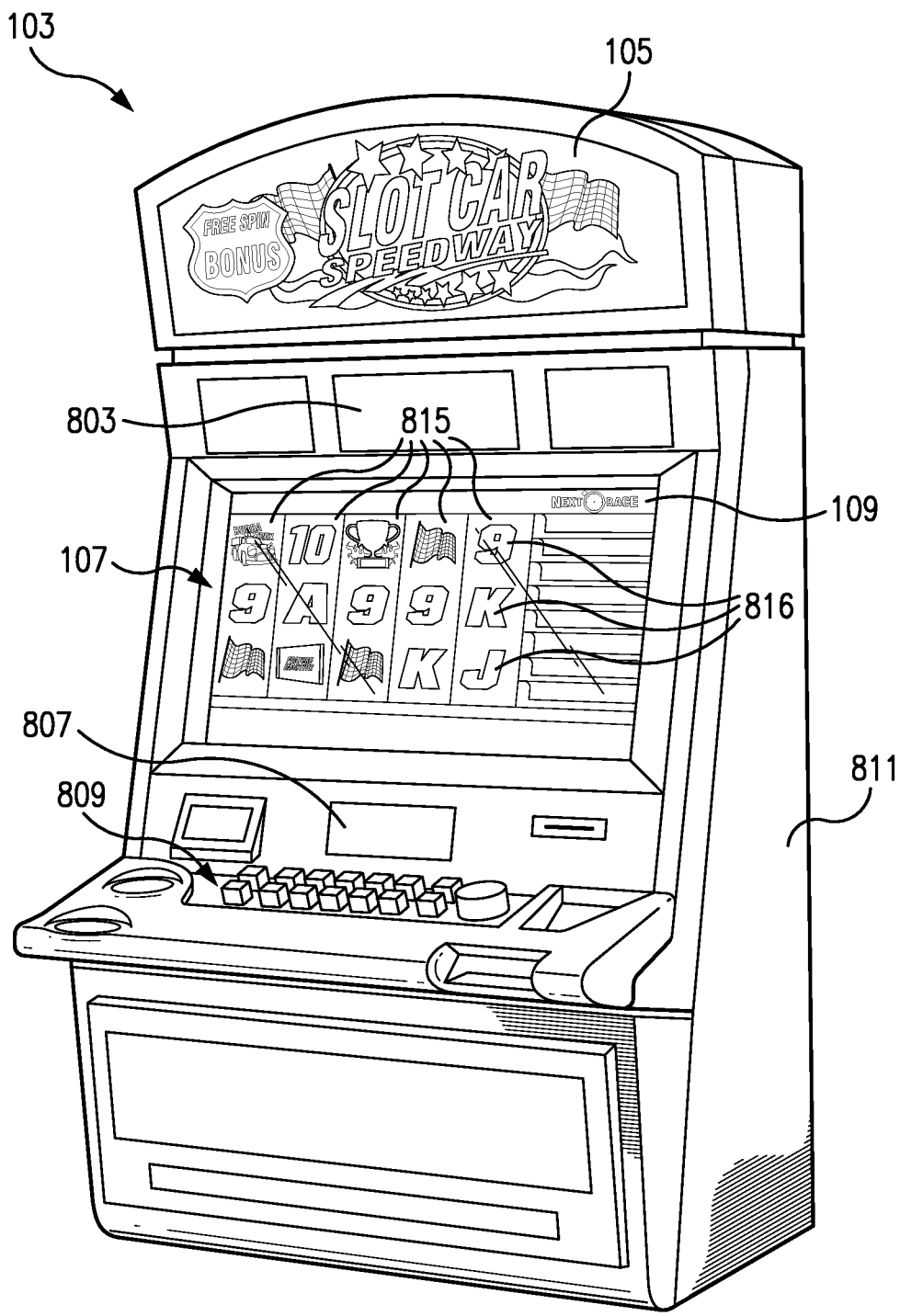
FIG. 8 illustrates a front view of an example gaming machine connectable with a bank of gaming machines and an overhead display to participate in a community feature game in accordance with one or more embodiments.

Referring to FIG. 8, example gaming machine 103 is shown including top glass display 105, middle display 803, primary display 107, lower display 807 and user interface 809, all mounted on a cabinet 811 in accordance with one or more embodiments of the invention. In the play of a primary game at gaming machine 103, a set of video or mechanical reels are spun to present a random or pseudo-random game outcome after the wagering game has been initiated with a wager by a patron and winning primary game outcomes are paid in accordance with a paytable and any additional games associated with gaming machine 801, such as feature or mystery bonus games. Top glass display 801 may comprise a programmable portion of or a separate display (such as an LCD, LED, TFT, etc. display) or glass painted, etched, etc. presenting information related to the primary game or theme, such as a display of the paytable associated with the primary game and indicating the awards payable on the various winning primary game outcomes. Display 803 (such as an LCD, LED, TFT, etc. display) may be used to display alternative games (such as a bingo, lottery or other wagering game) or other feeds presented through the network, such as advertisements, where the alternative games may or may not require separate wagers or consideration, such as player points accumulated in a player account by a player. Primary display 805 may display a primary game, such as the Slot Car Speedway™ reel game by Multimedia Games, Inc., and further display additional information such as lines wagered upon ("Lines"), bet per line ("Bet per Line"), total bet ("Total Bet"), credits on the gaming machine ("Credits"), and any winnings paid following a game play (which may include primary, feature, and community game play) ("Paid"). Display 807 may comprise a portion of another display device or separate display (such as an LCD, LED, TFT, etc. display) and may display selected information, such as the player's status with respect to a community feature game or the player's eligibility to participate in the community feature game. User interface 809 generally includes a button deck for entering the selected number of lines the player wishes to wager upon, the number of credits per line plus a side bet, and to initiate play of the primary game. User interface 809 may also include a card reader for receiving a player card and transmitting player information over a network, and, may include a bill acceptor and printer for receiving currency including tickets and printing tickets when a player desires to cash out from the gaming machine.

Gaming machine 103 may further include an internally connected game processor, a memory with primary and feature games coding including community feature game coding executable by the game processor, associated printed circuit board with ports connecting to various sub-assemblies housed in or about gaming machine cabinet 811 in accordance with one or more embodiments of the invention. While gaming machine 103 is shown as an upright gaming machine cabinet style, various cabinet styles may be utilized including a slant top cabinet style and a bar top cabinet style (where the cabinet may be part of a bar/table top and/or housed therein).

In the example gaming machine 103 shown in FIG. 8, primary display 805 shows a set of reels 815, each reel bearing a series of symbols 816. With the reels 815 in a stationary position, the symbols 816 visible through primary display 805 may be viewed as an array of symbols. During a wagering game, such as may be initiated by a player, the reels may be spun about an axle or simulated to spin under the control of a game processor which randomly or pseudo-randomly determines the game outcome and causes the reels to stop in accordance with the determined game outcome.

One or more paylines, combinations, or patterns of the symbols 816 including those visible through primary display 805 may be correlated to a game result payable in accordance with a paytable. Primary display 805 may thereby be used to display the game result to one or more patrons standing in front of gaming machine 103. While example gaming machine 103 includes a set of five reels 815, various numbers of reels may be selected or utilized in an implementation of one or more embodiments, such as one, two, three, four, five, six, seven reels, and so forth.

Additionally, while gaming machine 103 is described using video or virtual reels, reels 815 may be implemented with mechanical reels with fixed symbols or dynamic symbols (such as by using FOLED (flexible organic LED) reel strips wherein one or more symbols may be programmed dynamically to vary the symbol and/or its appearance). Additionally one or more display panels may be implemented to present each reel 815 virtually. In the case of virtual displays of the reels, the symbols may be fixed or animated on each of reels 815. Also, overlapping display panels may be implemented to generate video or display effects over reels 815. For example, display windows through which mechanical reels may be visible may be implemented as a transmissive (e.g. Aruze or WMS transmissive display panels) or transparent (e.g. Bally transparent display panels) display configured to display visual effects together with the reels under the control of the game processor during the operation of a wagering game. In the case of virtual reels, the virtual reels may be shown on a display device recessed a distance from the front surface of the surface of primary display 805 and segregated by dividers similar to dividers separating mechanical reels, which may provide a spatial characteristic (e.g. PureDepth® display panels).

Figure 9:
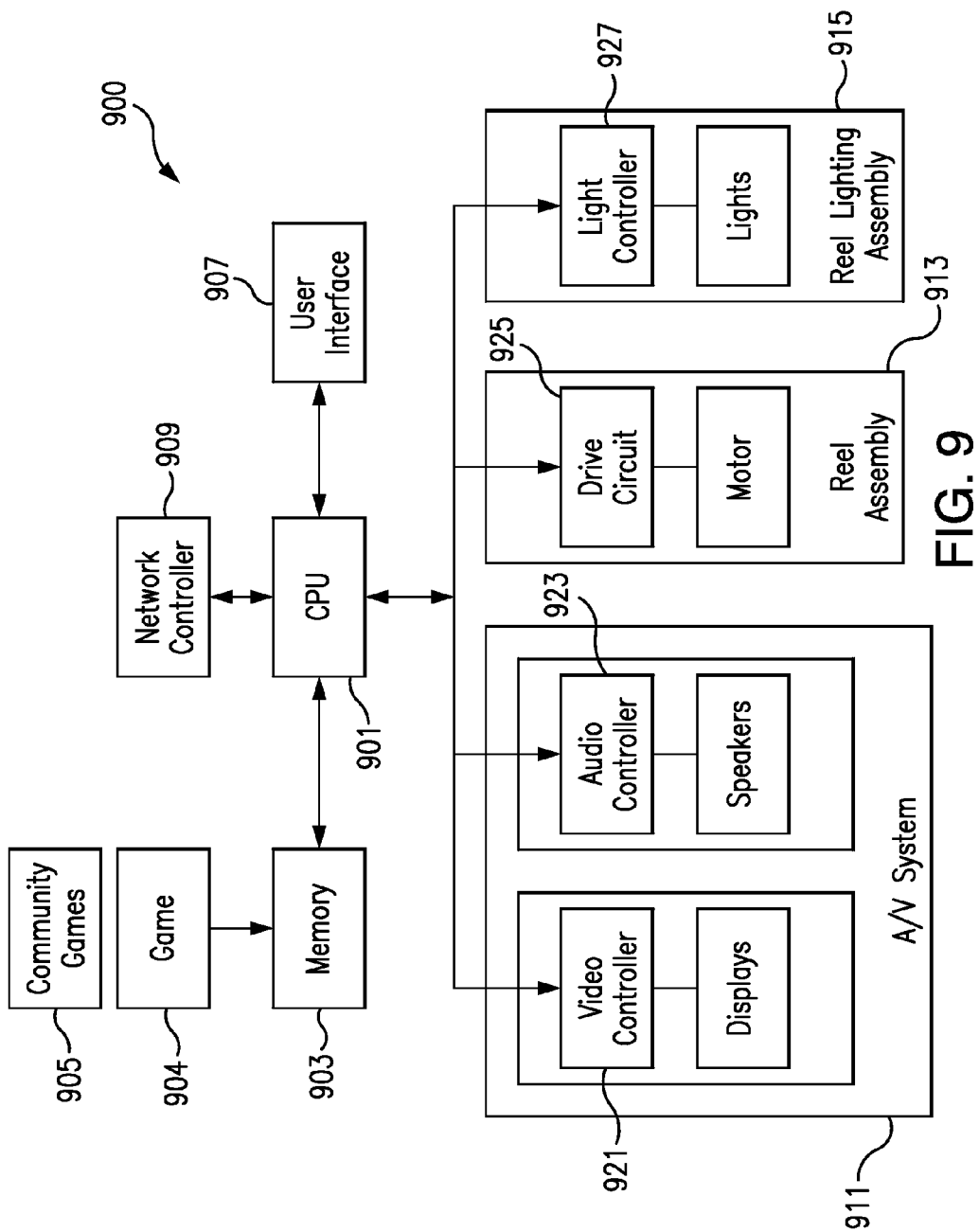
FIG. 9 illustrates an example logic diagram of an example gaming machine in accordance with one or more embodiments.

In one or more embodiments, the game processor operating the wagering game and controlling game lighting and effects in many instances is implemented as a microprocessor on a printed circuit board including one or more memory devices and other supporting devices positioned within gaming machine 103. Referring to FIG. 9, example control structure 900 of gaming machine 103 is shown in accordance with one or more embodiments of the present invention. Game processor (CPU) 901 may comprise a conventional microprocessor, such as an Intel Pentium® or Core® microprocessor for example, mounted on a printed circuit board with supporting ports, drivers, memory, and coding to communicate with and control gaming machine operations, such as through the execution of coding stored in memory 903 including one or more wagering games 904 and community game 905. Game processor 901 connects to user interface 907 (corresponding to interface 809 in FIG. 8) such that a player may enter input information and game processor 901 may respond according to its programming, such as to apply a wager and initiate execution of a game. Game processor 901 also may connect to a network, such as a casino server network which may include host, player tracking, and accounting server functionality through network controller 909 to enable network monitoring and sharing of data and information between respective of the servers in the network and gaming machine 103. Game processor 901 may also connect to various devices within and about the gaming machine including A/V system 911, reel assembly 913, and reel lighting assembly 915 through respective controllers, such as one or more video controllers 921, audio controllers 923, motor drive circuit controller 925, and light controller 927. In the case where the reels are implemented using a video display, reel assembly 913 and reel lighting assembly 915 may be modified or eliminated depending upon the desired configuration. For example, in one or more embodiments, it may be desirable to use reel lighting assembly 915 to amplify or provide various light effects in conjunction with a video reel display during game play, alternatively this functionality may be absorbed into the video display coding and presentation.

Generally, activity at gaming machine 103 may be initiated by a player inserting currency and/or a player card into a bill acceptor and card reader, respectively. Upon insertion, a signal is sent to game processor 901. In the case of the insertion of a player card, the card reader transmits card information which may be directed through network controller 909 to a player tracking server connected to the network. Player data may then be transmitted to gaming machine 103, and, responsive to the data, game processor 901 may execute coding causing player data and a display (and possibly an audio) command to be transmitted to one of the video and/or audio controllers instructing the controllers to display player information on a respective display and possibly issue an audio greeting through one or more respective speakers.

In the case currency is inserted in the suitable bill acceptor device at gaming machine 103, the bill acceptor sends a signal to game processor 901 which may include an identification of the currency that has been read. Game processor 901 in accordance with its coding may convert the currency amount to credits and transmit a store and display signal to a credit meter and its associated display ("Credits"). Once credits have been associated with the credit meter (via the insertion of currency or otherwise), the player may select the number of paylines and credits per line that the player wishes to wager, whereupon game processor 901, in accordance with its coding, receives the wager information from user interface 907, and may transmit accounting and display information to the payline ("Lines"), credits per payline ("Bet per Line"), and total bet ("Total Bet") meters and displays, transmits an update to the credit meter and display ("Credits") deducting the amount of the total bet, and initiates the wagering game.

In the case of Class III gaming devices, when a game is initiated, a random number generator (RNG) may be operated by game processor 901 to determine the game outcome. Commonly, game processor 901 is positioned within gaming machine 103 and configured to manage the operation of the gaming machine components, such as shown in FIG. 9. Game processor 901 may be implemented with a microprocessor, controller, and/or digital signal processor to execute coding, transmit the wager and game request information through the network, and operate an RNG to determine the game outcome. In one or more embodiments, coding may be implemented and stored in memory 903, executable by game processor 901 to control the primary and feature game execution and to control associated electro-mechanical devices, such as reel lighting, speakers, and reels through respective video, audio, reel drive motor controllers, and lighting controllers 921, 923, 925, 927.

In addition, coding may be stored to execute and/or integrate gaming device operation with a community feature game, such as described herein, where gaming machine 103 may be designated as the community feature game controller or one of the client gaming machines on the bank. For example, each gaming device 103 of a bank may include coding executable by the respective game processor to initiate and operate the community game and also coding to respond as a client gaming machine on the bank responsive to a primary controller. One of the gaming devices 103 may be designated as the primary controller responsible for operating the community game and overhead display 101 (FIG. 1). In the case that the primary controller becomes unavailable, a second gaming device may be designated as the backup primary controller and a rule of succession may be coded into each of gaming machines 103 of a respective bank. Each of the gaming devices may include monitoring coding executable on an ongoing periodic basis to ascertain which gaming device is the active primary controller during a given time period. Alternatively, the primary controller may be responsible to execute periodic polling of each of gaming machines 103 of the respective bank. In the event that the backup primary controller does not receive a poll within a designated period, the backup primary controller may commence operation as primary controller, commence polling operations, and commence execution of coding to randomly determine when to initiate the associated community game.

It will be appreciated that the gaming machine control arrangement shown in FIG. 9 is shown only for purposes of example and is not intended to limit the present invention to any particular game control arrangement. Furthermore, games according to the present invention may rely on a central determinant system remote from the gaming machine for providing the outcome for a given play of the primary or community game. Also, substantially any game accounting system may be employed with a gaming machine within the scope of the present invention, and the invention is not limited to currency based systems. For example, game play credits may be made available for play of a primary game at a gaming machine within the scope of the present invention using a player account card or credit voucher/ticket, or by any other means.

Figure 10:
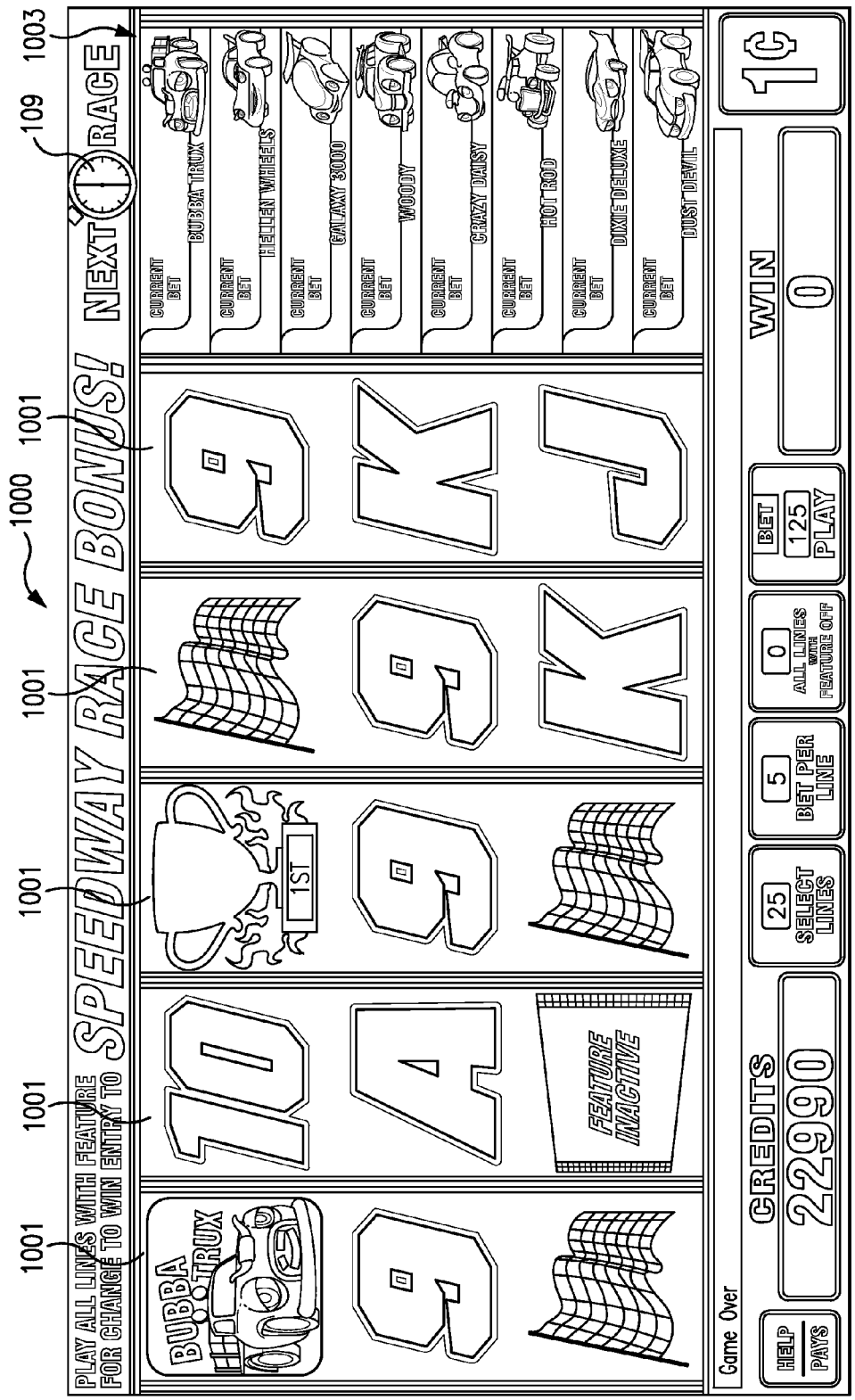
FIG. 10 illustrates an example screenshot of a reel-based game with a primary display area displaying a set of reels and associated symbols, a sideboard area showing the current player as having no bets recorded for the next community game and being thereby currently ineligible to participate, and, a header area including a countdown timer for the beginning of the next community game, all of which may be displayed on a player-viewable display, such as a primary game display, in accordance with one or more embodiments.

Referring to FIG. 10, example screenshot 1000 of a reel-based game is shown with a primary display area displaying a set of reels 1001 and associated symbols, a sideboard area 1003 showing the current player as having no bets recorded for the next community game and being thereby currently ineligible to participate, a header area including a countdown timer 109 for the beginning of the next community game, and a footer area including a display of the current player's credits and wagers, all of which may be displayed on a player-viewable display, such as a primary game display (107 in FIG. 8 for example), in accordance with one or more embodiments. Countdown timer 109 may comprise simply a clock hand which sweeps toward and end position (twelve o'clock for example) which indicates the point at which the next community game will be triggered. Some implementations of countdown timer 109 may include a different color (such as red) behind the sweep of the hand to better emphasize the time remaining before the next community game. Of course, although an analog clock is shown for purposes of example, other implementations may use a digital clock or an analog or digital meter to indicate the time remaining until the next feature game.

Figure 11:
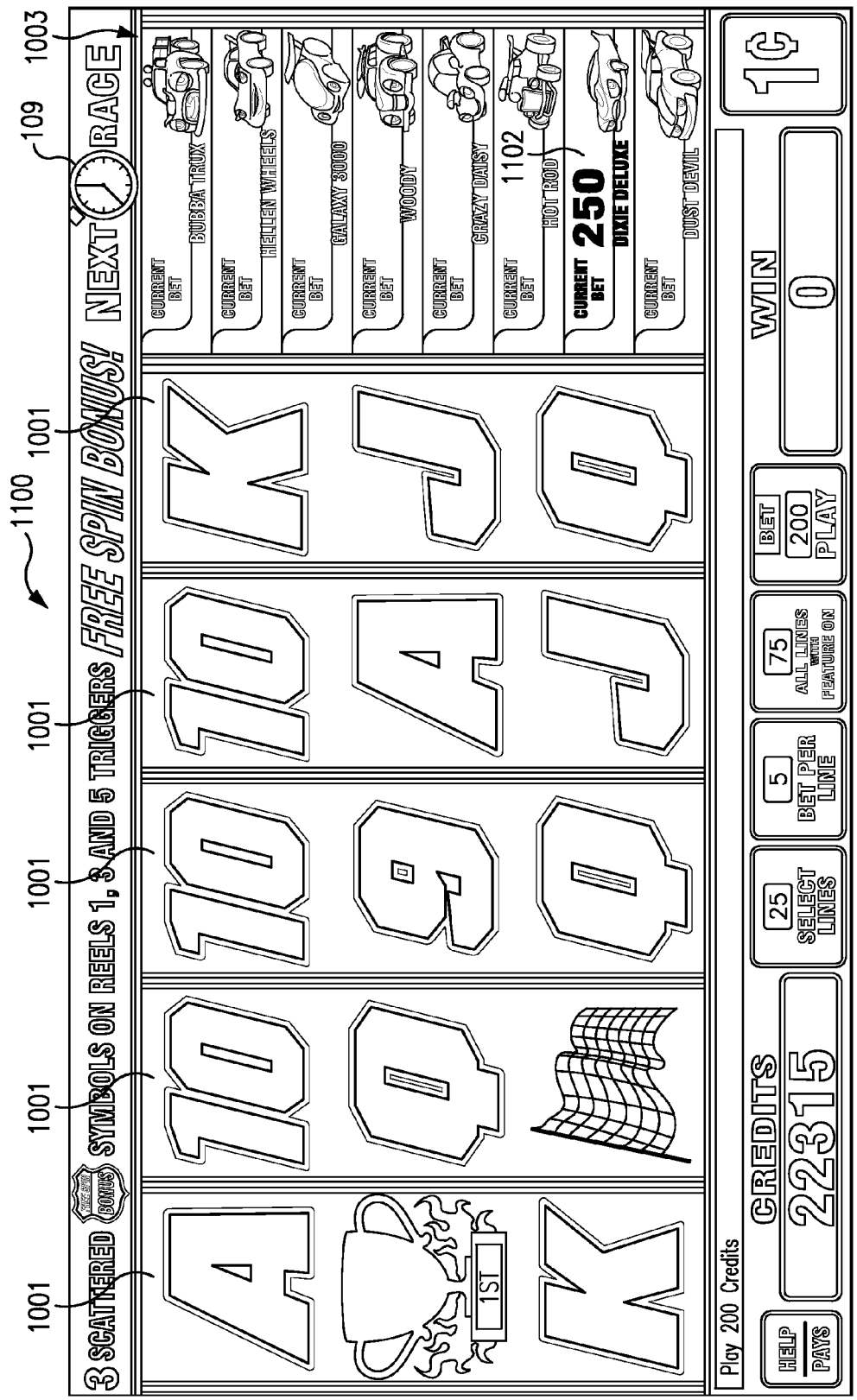
FIG. 11 illustrates an example screenshot of a reel-based game with a primary display area displaying a set of reels and associated symbols, a sideboard area showing the current player as having one '250 credit' bet recorded for the next community game and being thereby currently eligible to participate, and, a header area including a countdown timer for the beginning of the next community game, all of which may be displayed on a player-viewable display, such as a primary game display, in accordance with one or more embodiments.

Referring to FIG. 11, example screenshot 1100 of a reel-based game is shown with a primary display area displaying the set of reels 1001 and associated symbols, the sideboard area 1003 showing the current player as having one '250 credit' bet recorded for the next community game and being thereby currently eligible to participate, and, a header area including a countdown timer 109 for the beginning of the next community game, all of which may be displayed on a player-viewable display, such as a primary game display (107 in FIG. 8 for example), in accordance with one or more embodiments. The player's bet for the next community game is indicated by marker 1102 in sideboard area 1003.

Figure 12:
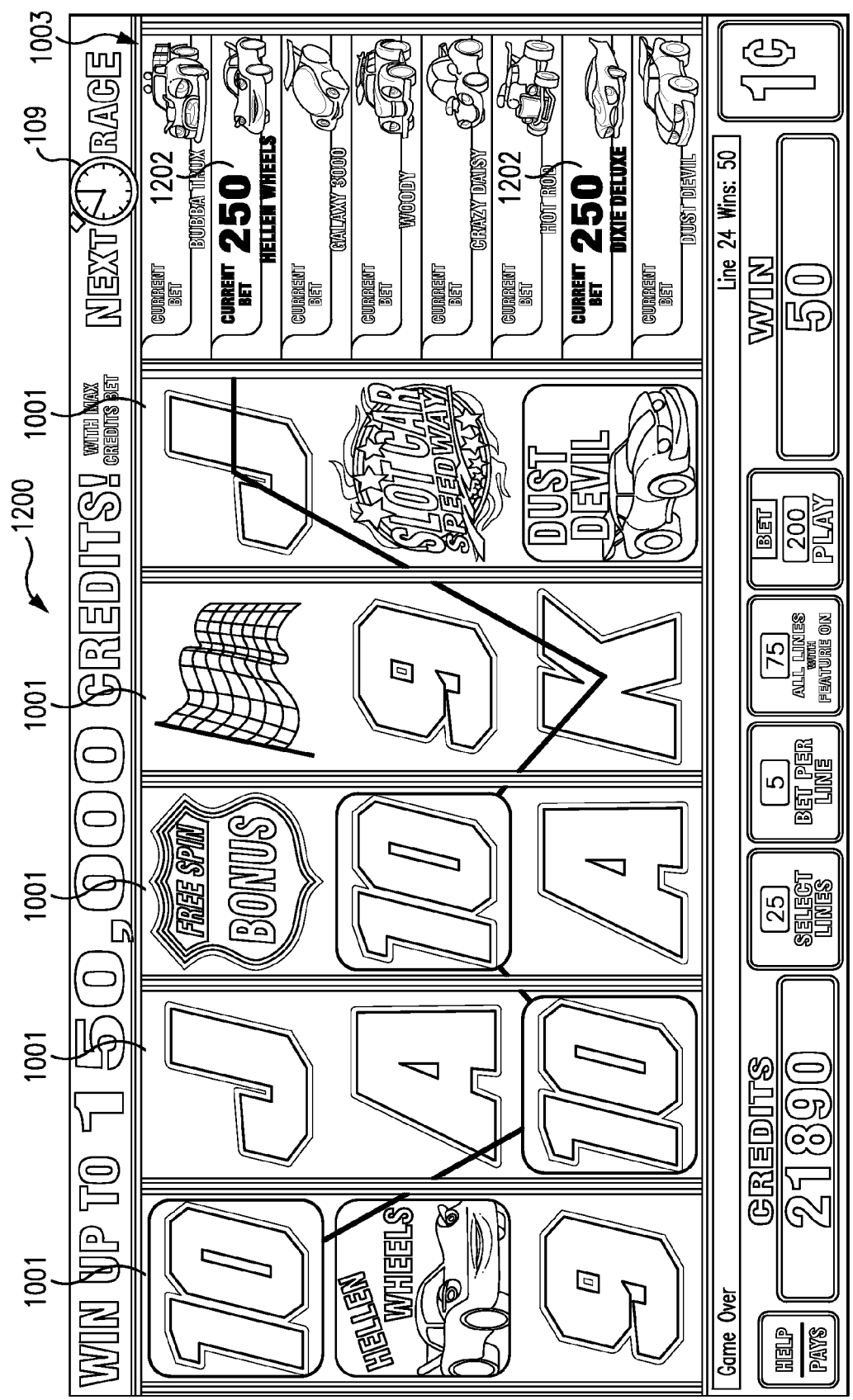
FIG. 12 illustrates an example screenshot of a reel-based game with a primary display area displaying a set of reels and associated symbols, a sideboard area showing the current player as having two '250 credit' bets recorded for the next community game and being thereby currently eligible to participate, and, a header area including a countdown timer for the beginning of the next community game, all of which may be displayed on a player-viewable display, such as a primary game display, in accordance with one or more embodiments.

Referring to FIG. 12, example screenshot 1200 of the reel-based game is shown with a primary display area displaying a set of reels 1001 and associated symbols, the sideboard area 1003 showing the current player as having two '250 credit' bets recorded for the next community game and being thereby currently eligible to participate, and, a header area including countdown timer 109 for the beginning of the next community game, all of which may be displayed on a player-viewable display, such as a primary game display (107 in FIG. 8 for example), in accordance with one or more embodiments. The player's two bets for the next community game are each indicated by a respective marker 1202.

Figure 13:
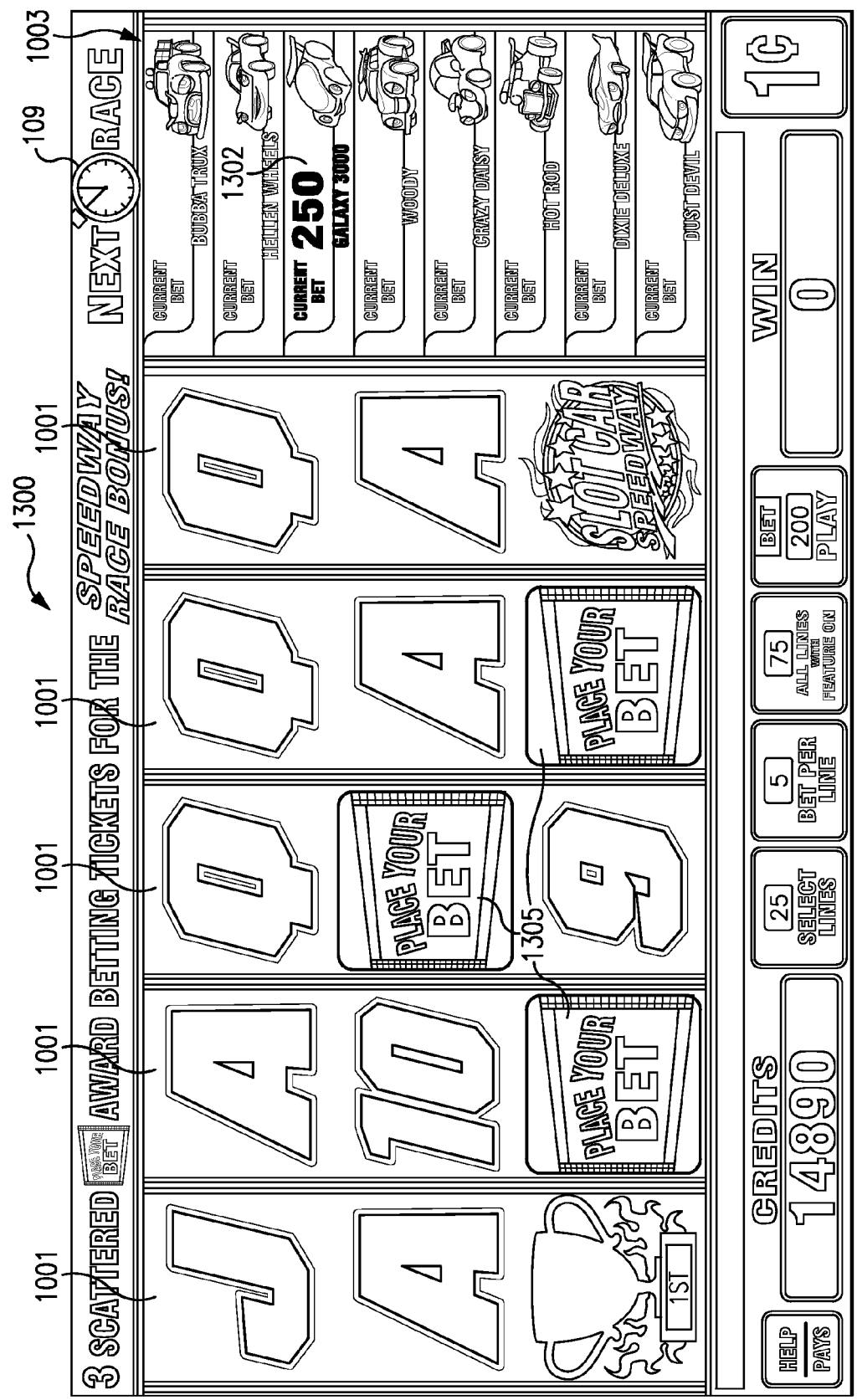
FIG. 13 illustrates an example screenshot of a reel-based game with a primary display area displaying a set of reels and associated symbols including three scattered 'Place Your Bet' symbols triggering the Speedway Race Bonus (enabling the player to enter another bet for the next community game), a sideboard area showing the current player as already having one bet recorded for the next community game and being thereby currently eligible to participate, and, a header area including a countdown timer for the beginning of the next community game, all of which may be displayed on a player-viewable display, such as a primary game display, in accordance with one or more embodiments.

Referring to FIG. 13, example screenshot 1300 of the reel-based game is shown with a primary display area displaying a set of reels 1001 and associated symbols including three scattered 'Place Your Bet' symbols 1305 triggering the Speedway Race™ Bonus (enabling the player to enter another bet for the next community game), the sideboard area 1003 showing the current player as already having one bet recorded for the next community game and being thereby currently eligible to participate, and, a header area including countdown timer 109 for the beginning of the next community game, all of which may be displayed on a player-viewable display, such as a primary game display (107 in FIG. 8 for example), in accordance with one or more embodiments.

Figure 14:
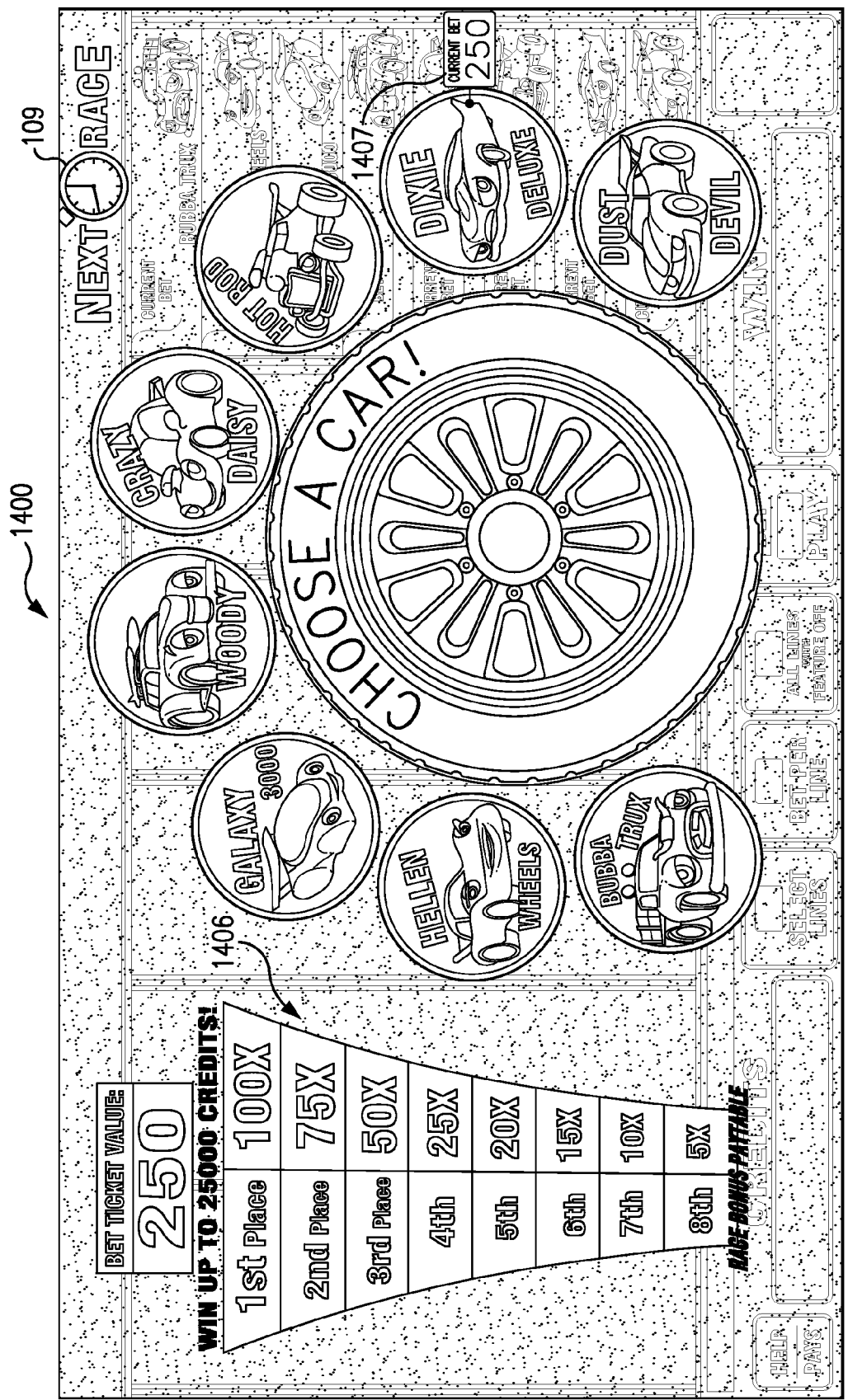
FIG. 14 illustrates an example screenshot of the Speedway Race Bonus triggered by the appearance of three scattered 'Place Your Bet' symbols in the primary game, wherein the player is provided a '250' Bet Ticket Value and the opportunity to select one of the race cars upon which to bet for the next community game. The screenshot further displays the paytable for the community race bonus, the car whereon the player has already placed a bet, and the time remaining prior to the start of the next community game, all of which may be displayed on a player-viewable display, such as a primary game display, in accordance with one or more embodiments.

Referring to FIG. 14, example screenshot 1400 is shown of the Speedway Race™ Bonus betting interface triggered in this example by the appearance of the three scattered 'Place Your Bet' symbols 1305 in the primary game as shown in FIG. 13. In this interface shown in FIG. 14 the player is provided a '250' Bet Ticket Value and the opportunity to select one of the race cars upon which to bet for the next community game. Screenshot 1400 further displays the paytable 1406 for the community race bonus, the car whereon the player has already placed a bet (as indicated by symbol 1407), and countdown timer 109 showing the time remaining prior to the start of the next community game. All of the features in screenshot 1400 may be displayed on a player-viewable display, such as a primary game display (107 in FIG. 8 for example), in accordance with one or more embodiments. When provided a Bet Ticket opportunity, the player may bet on the same or a different car, such that, multiple bets may be placed on the same car by the same player. Also, multiple bets may be placed on the same car by different players and each player is paid winnings based on their own bets.

Figure 15:
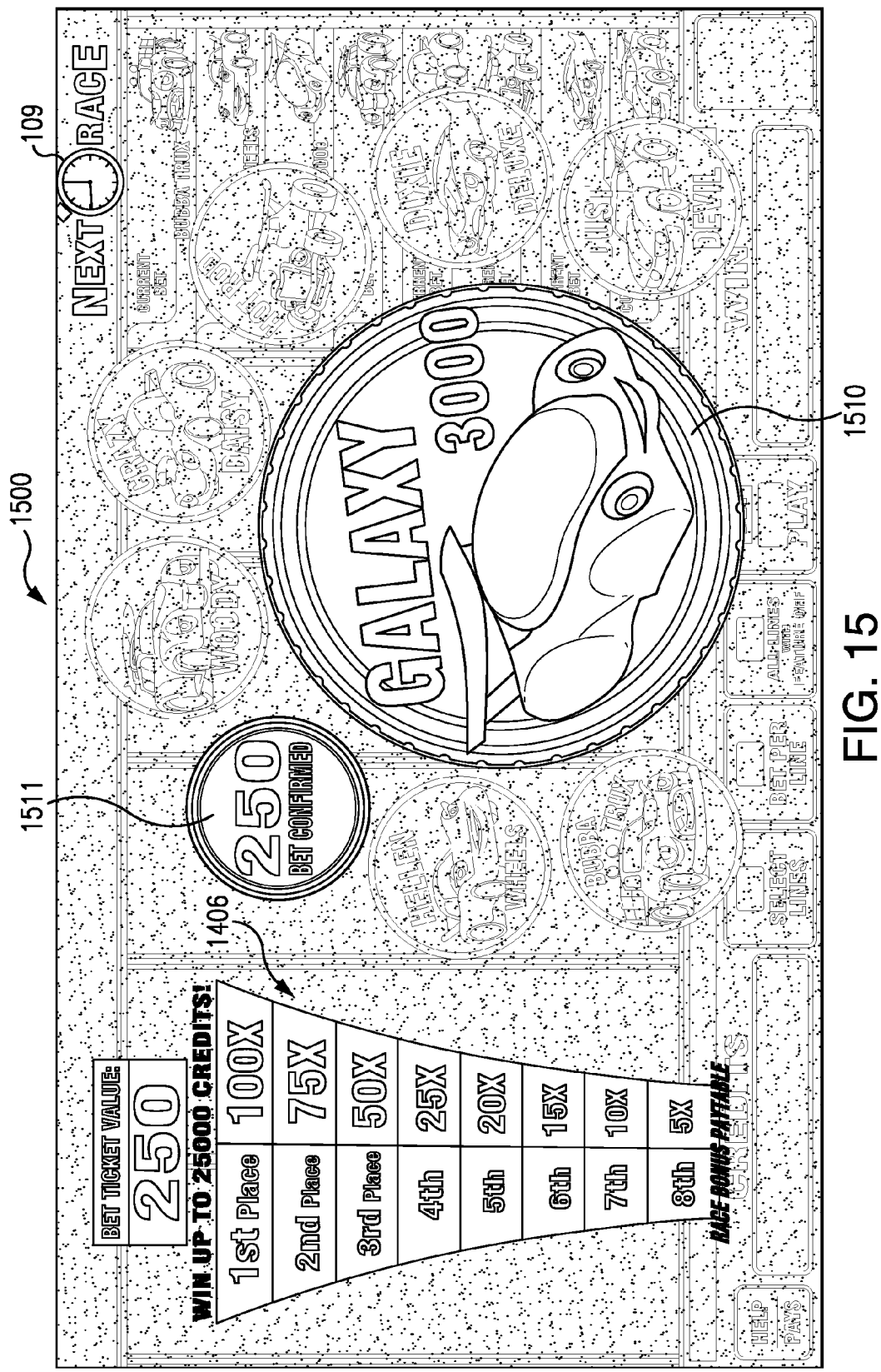
FIG. 15 illustrates an example screenshot of the Speedway Race Bonus triggered by the appearance of three scattered 'Place Your Bet' symbols in the primary game, wherein the player has been provided a '250' Bet Ticket Value to place on one of the race cars and has made an election (or choice) shown by the highlighted car icon 'Galaxy 3000'. The screenshot further displays the paytable for the community race bonus and the time remaining prior to the start of the next community game, all of which may be displayed on a player-viewable display, such as a primary game display, in accordance with one or more embodiments.

Referring to FIG. 15, example screenshot 1500 is shown of the Speedway Race™ Bonus triggered by the appearance of three scattered 'Place Your Bet' symbols 1305 in the primary game as shown for example in FIG. 13. In accordance with the bonus game, the player has been provided a '250' Bet Ticket Value to place on one of the race cars. FIG. 15 shows the state of the graphic in response to the player's election of one of the cars. In particular, the player has elected (chosen) the car 'Galaxy 3000' and this election is shown in the example by showing car icon 'Galaxy 3000' in central area 1510 and showing the notice '250 Bet Confirmed' at the location 1511 of the 'Galaxy 3000' icon that the player invoked in order to select that car (note the location of the 'Galaxy 3000' icon on the selection screen of FIG. 14 prior to the player's selection). The screenshot 1500 in FIG. 15 further displays the paytable 1406 for the community race bonus as shown in FIG. 14, and also displays at countdown timer 109 the time remaining prior to the start of the next community game. All of screenshot 1500 may be displayed on a player-viewable display, such as primary game display 107 in FIG. 8, in accordance with one or more embodiments. It is noted that the remainder of the graphic aside from the icon at area 1510, the message at area 1511, paytable 1406, and countdown timer 109, may be shown in a muted or faded graphic form to emphasize the icons at areas 1510 and 1511 along with paytable 1406 and timer 109.

Following entry of a bet pursuant to the screen graphic shown in FIG. 14 (which changes the graphic to a "selected" graphic as shown in FIG. 15, a banner (not shown) may be displayed notifying the player that the player may increase or make additional bets on the community feature game by continuing play. For example, the banner may recite "Keep playing to win more tickets for the next race." This banner may be shown whether the player bets from a bet selection graphic (such as in FIG. 14) triggered in the primary game or otherwise. It should also be noted that the bet selection graphic of FIG. 14 may be triggered during a play in a primary game at the gaming machine, a play in a secondary game at the gaming machine, of in a free spin bonus which may be available at the gaming machine, or in any other way.

Figure 16:
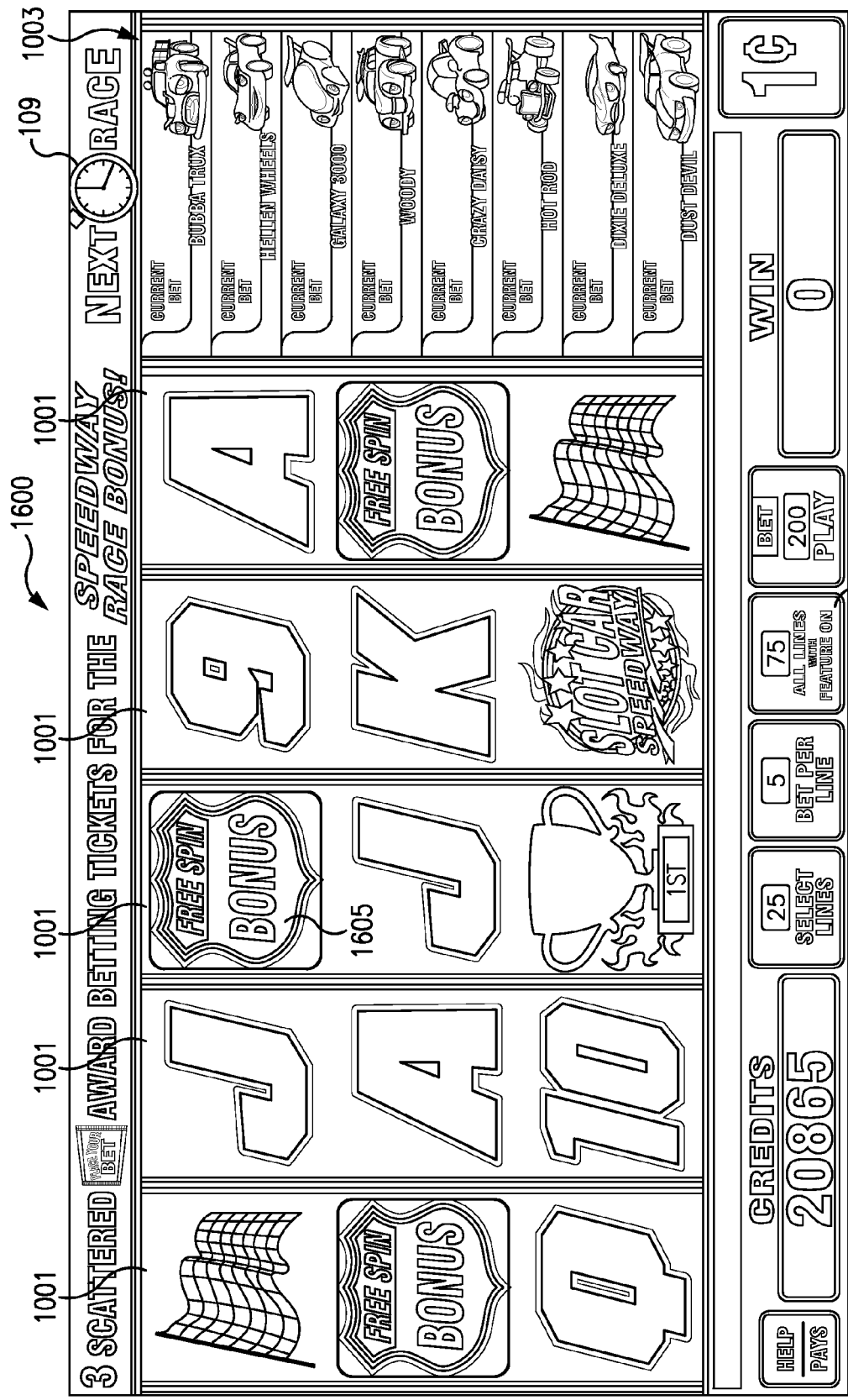
FIG. 16 illustrates an example screenshot of a reel-based game with a primary display area displaying a set of reels and associated symbols including three scattered 'Free Spin Bonus' symbols triggering the Free Spin Bonus wherein the player receives a randomly or pseudo-randomly determined number of free games, a sideboard area showing the current player has no bets recorded for the next community game and being thereby currently ineligible to participate, a footer area including a display of the current player credits and bets which indicate that the player has entered a maximum bet to attempt to gain entry to the next community game, and, a header area including a display of the countdown timer for the beginning of the next community game, all of which may be displayed on a player-viewable display, such as a primary game display, in accordance with one or more embodiments.

Referring to FIG. 16, example screenshot 1600 of a reel-based game is shown with a primary display area displaying the set of reels 1001 and associated symbols including three scattered 'Free Spin Bonus' symbols 1605 triggering the Free Spin Bonus wherein the player receives one or more free games (plays of the reel-type game with requiring a wager). Screenshot 1600 also shows the potential contestants in the next community game in sideboard area 1003 showing the current player has no bets recorded for the next community game and being thereby currently ineligible to participate. Screenshot 1600 further includes the footer area including a display of the current player credits and bets which indicate particularly at item 1606 that the player has entered a maximum bet to attempt to gain entry to the next community game. As with the screenshots shown in FIGS. 10-12, a header area in screenshot 1600 includes a display of the countdown timer 109 for the beginning of the next community game. All of these features shown in screenshot 1600 may be displayed on a player-viewable display such as a primary game display 107 in FIG. 8, in accordance with one or more embodiments.

Figure 17:
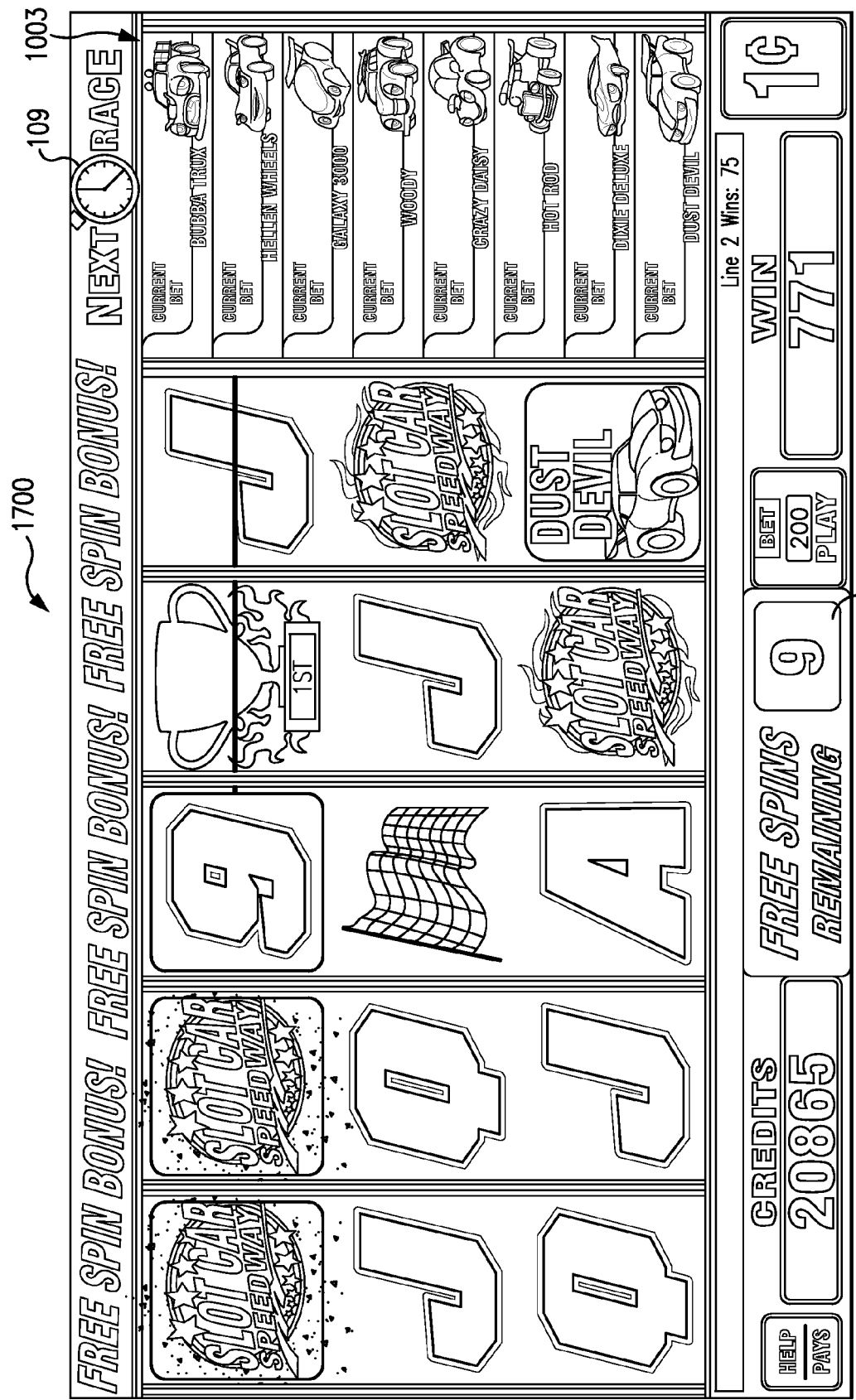
FIG. 17 illustrates an example screenshot of the Free Spin Bonus triggered by the appearance of three scattered 'Free Spin Bonus' symbols in the primary game, wherein the player is provided a series of free spins. The screenshot further displays the free spins remaining (footer area), the time remaining prior to the start of the next community game (header area), and a sideboard area showing the current player has no bets recorded for the next community game and being thereby currently ineligible to participate, all of which may be displayed on a player-viewable display, such as a primary game display, in accordance with one or more embodiments.

Referring to FIG. 17, example screenshot 1700 is shown of the Free Spin Bonus triggered by the appearance of the three scattered 'Free Spin Bonus' symbols 1605 in the primary game. In this Free Spin Bonus the player is provided a one or more free spins. Screenshot 1700 further displays the free spins remaining in area 1710, the time remaining prior to the start of the next community game though countdown timer 109, and the sideboard area 1003 showing the current player has no bets recorded for the next community game and being thereby currently ineligible to participate. All of the graphic features of screenshot 1700 may be displayed on a player-viewable display such as a primary game display 107 in FIG. 8, in accordance with one or more embodiments. During the Free Spin Bonus, all lines may pay a multiple of conventional play. For example, all winning paylines may pay three times the win amount listed in the paytable. Also, a bonus within a bonus may be triggered, as for example when three scattered 'Place Your Bet' symbols occur within the Free Spin Bonus. In this case the selection graphic of screenshot 1400 may be displayed as shown in FIG. 14. Once the selection is made and after the completed selection graphic along the lines of FIG. 15 is displayed, the game play may return to the Free Spin Bonus until all free spins are completed and then to the primary game.

Figure 18:
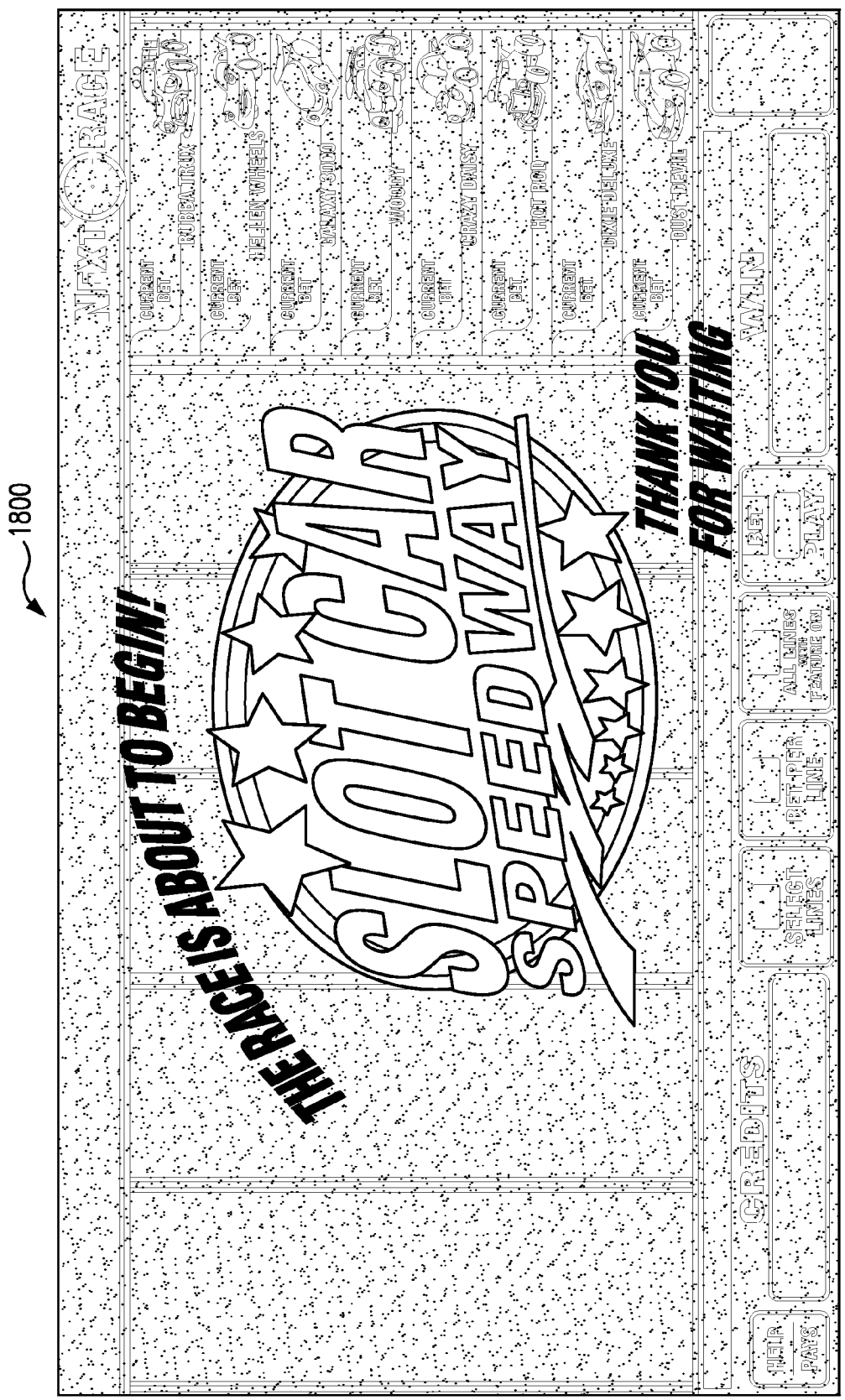
FIG. 18 illustrates an example screenshot of a primary game wherein a banner is displayed to notify the player that the community game has been triggered and that further play of the primary game has been disabled in accordance with one or more embodiments. A snapshot of the state of the gaming machine is recorded and following the community game, the gaming machine is re-enabled at the same state of the primary game. For example, if the player was playing a Free Spin Bonus at the time of the disablement, the remaining number of free spins is re-instated and the Free Spin Bonus continues.

Referring to FIG. 18, example screenshot 1800 may be shown to notify the player that the community game has been triggered and that further play of the primary game (or other game being conducted at the commencement of the community game) has been interrupted in accordance with one or more embodiments. A snapshot of the state of the gaming machine may be recorded and following the community game, the gaming machine may be re-enabled at the same state of the primary game or other game.

For example, a player on the bank, who is eligible to play the community feature game, may have been playing a Free Spin Bonus (as shown at FIG. 17 for example) at the time the community feature game is triggered. A banner such as that shown in FIG. 18 may appear across the player's screen advising the player of the impending beginning of the community feature game and interrupting play of the primary game. The state of the primary game may be stored including the remaining number of free spins, so that once the community feature game is completed, the primary game may be restored in accordance with the stored game state and the Free Spin Bonus may continue. In one or more embodiments, the Free Spin Bonus may only be interrupted directly before a spin and may not be interrupted while the reels are spinning or while banging up credits. In such a case, if the gaming machine is banging up credits when the race is triggered, then the interrupt may occur at some predetermined point such as just before the next spin or after the bonus is over, whichever comes first.

In one or more embodiments, a primary game may be interrupted during play of a game. In this case the game may be stored during play of the community feature game and resumed at the state of its interrupted primary game following play of the community feature game. In one or more embodiments, a player may be provided an option to resume the interrupted game or to request a new play. In one or more embodiments, if a primary game is interrupted during game play, the player may not be provided an option and the gaming machine may be programmed to either continue the interrupted game play or to initiate a new game play. In either case, the player's original wager at the time of the game interruption may be applied as the wager.

Referring again to FIG. 8, in one or more embodiments, gaming machine 103 may include two or more executable games. Following one or more plays of a first game, a player may be provided an option to interrupt play of the first game and initiate play of a second game. In the event that the player elects to play the second game, play of the first game may be interrupted and the state of the first game stored in memory. Following one or more plays of the second game, the player may either be provided an option to resume play of the first game or may automatically be returned to play of the first game, and, the first game may be resumed in accordance with the stored game state information. For example, the second game may be selectable from a menu of games available for play on gaming machine 103 at any time. In another example, the second game may be triggered randomly or pseudo-randomly on gaming machine 103 and the player may be provided the opportunity to play, in which case an additional wager may be required. In a further example, the second game may be provided without further wager by the player. Continuing with this example, the player may qualify for the second game through play on the first game (e.g. FIGS. 13-14, except that the community feature game may be played by a player as a stand-alone game).

In one or more alternate embodiments, gaming machine 103 may operate a primary game and a feature game as stand-alone games, wherein the feature game may be operable substantially as described herein (the car race game) except that both the primary game and feature games may operated without any participation by another player. By example, the feature game may be triggered by the same or similar types of mechanisms as described with respect to the community feature game (such as through an RNG operable by game processor 901 or by use of a threshold based on the accumulated amount of side bets or wagers on respective gaming machine 103, or any combination thereof, or, by the appearance of a predetermined number of special symbols on or off an active payline).

Once triggered, the feature game may be displayed on one of the displays operable by gaming machine 103, such as display 105 or 107 on which a video representation of the feature game may be presented by either replacing or overlaying primary game display content. For example, if display 107 includes mechanical reels, the display may also include an overlaying display (such as a flat panel display) which may be changed from a transparent mode to a feature game display mode by game processor 901 to mask the mechanical reels. In the case in which display 107 comprises two or more displays with or without mechanical reels, one or both displays may be used separately or together to display video content for the primary game and one or more bonus or feature games (for example, special effects or symbols may be rendered through an overlaying display while the underlying display displays the reels of the primary, bonus or feature games, depending upon which game is being shown or played and if the respective game includes reels).

In the stand-alone feature game (as in the herein described community feature game), the player may play the primary game with opportunities to trigger one or more bonus games, such as the Free Spin Bonus, and qualify to play the feature game (e.g. stand-alone version of the Slot Car Race feature game described herein) by winning betting tickets and selecting feature game participants (e.g. virtual cars). For example, once a player qualifies for the feature game, a timer may be initiated and displayed (such as that shown in the various screenshots) to let the player know when the next feature game will commence. Alternatively, the feature game may be triggered by an RNG or subsequent game event following qualification of a player in the gaming session. In one or more embodiments, a minimum wager and/or rate of play may be required to maintain eligibility for the feature game. In the case of a minimum playing requirement, a meter may be displayed on one of the displays of gaming machine 103 to alert the player of eligibility (for example, a green to red meter which displays green when playing with the requisite wager and red when the player hasn't played within the required time period).

In one or more embodiments, an option may be provided to store the game state and return at a subsequent time to continue playing. For example, a player may qualify for the feature game, but choose to discontinue play. In such case, the gaming system may provide an option to the player to save the game state and resume the game at a later time when the player uploads an identification to the gaming system. For example, the gaming system may include a player tracking system and gaming machine 103 may include a player card reader, such that when the player re-inserts the player's player card, the gaming system identifies the player and may provide an option (such as through a menu on display 807) for the player to resume the stored game state. The stored game state may be stored for a limited or indefinite period of time depending upon the gaming system programming. The player may have the option to resume game play or initiate a new game session. In the event that the player elects a new game session, the stored game state may or may not be retained in the gaming system depending upon the gaming system programming.

As with the community feature game, the player may qualify for various bets on the feature game as the result of primary game play. Once a player has played the minimum required for eligibility for the feature game, if the feature game is triggered by the primary game play (such as by the appearance of special symbols) or triggered by an alternate trigger mechanism (such as through a random selection performed periodically (for example every second) by game processor 901 using an RNG) within a predetermined period (such as eight seconds) following the end of a prior qualified play, then the feature game may commence. In the event that the player has not qualified for the feature game, triggering of the feature game may be suppressed based on the game coding executed by game processor 901.

In one or more alternate embodiments, the community or stand-alone feature game may include player participation, such as by providing a player with a player-controlled wheel, joy stick, rolling ball-in-socket, brake, accelerator, or virtual representations of one or more such control devices with which to navigate an object, such as a car, around a displayed terrain, surface, track, or field. In which case, a player may be limited to betting on a single participant or a player may be able to place a back-up bet on a participant 'owned' (already selected by another player). An option may be provided enabling the player's object to be automatically navigated about the track according to programming. In the event that a player has bet upon and 'owns' more than one participant in the feature game, then the player may be allowed to navigate one of the participant's while any other of player's 'owned' participants may be automatically navigated by the game. In an example embodiment, the feature game may be a race track in which each participant engages in a time trial so that each player's participant may be separately navigated around a track. In another embodiment, multiple heats may be provided whereby two participants engage in a race in which they may compete head-to-head and the winner may move up to the next stage of heats until a winner is finally obtained. The community feature game may be implemented as a stand-alone game wherein the other participants are managed by the game. The player may receive awards based on bets placed on the respective participants. Those bets may be initiated such as by qualification (e.g. three scattered 'Select Your Bet' symbols obtained in the primary game) or by simply placing wagers after triggering the feature game.

Referring to FIG. 19, a block diagram of example gaming network 1900 associated with one or more gaming facilities is shown including overhead display 101 for a community game operably connected to a designated bank of gaming machines 103 to provide a community feature game (as described herein) in accordance with one or more embodiments.

As shown, a selected bank of gaming machines 103 (Egm 1-Egm N) and overhead display 101 may be network connected through Floor Server 1905 to Host Server 1907 which in turn connects to various back-end servers, such as player account server 1908, accounting server 1909, progressive server 1910, web server 1911, game server 1921, and central determination server 1923 (in the case of Class II gaming operations and other gaming operations in which outcomes are determined at a central device rather than at the gaming machine itself).

In one or more embodiments, game server 1921 may provide server-based games and/or game services to network connected gaming devices, such as gaming machines 103 (which may be connected by network cable or wirelessly). Progressive server 1910 may accumulate progressive awards by receiving defined amounts (such as a percentage of the wagers from eligible gaming devices or by receiving funding from marketing or casino funds) and provide progressive awards to winning gaming devices upon a progressive event. Such a progressive event may include a progressive jackpot game outcome or other triggering event such as a random or pseudo-random win determination at a networked gaming device or server (such as to provide a large potential award to players playing the community feature game). Accounting server 1909 may receive gaming data from each of the networked gaming devices and perform audit functions. Player account server 1908 may maintain player account records and persistent data such as accumulated player points. With reference to FIG. 19, while a few servers have been shown separately, they may be combined or split into additional servers having additional capabilities.

As shown, in one or more embodiments, gaming network 1900 may include web server 1911 connected to a public web network, such as worldwide web (WWW) network 1913. Community Game Website 1915 may externally connect through network 1913 to web server 1911 through a firewall in order to provide access by gaming network 1900 to player information, such as a player's community game or associated points obtained from non-wagering gaming activity. Such a service, for example, may be offered to a casino operator on a fee basis or through a subscription service with the community game website provider, whereby a casino operator may access a player's records, view a player's activity at community game website 1915, and choose, based on the player's activity, to offer or provide promotional credits or incentives to the player at the casino operator's facilities.

Community gaming website 1915 may offer players a variety of games to play including the community feature game as substantially disclosed herein. A player may have an opportunity to sign-up to establish an account and be provided free playing credits of no remunerative value. By playing one or more of the games, the player may accumulate player points to establish a playing record which may later be accessed by a subscribing casino operator as described above. In one or more embodiments, the accumulated player points may have a remunerative value, such as for obtaining rewards. An example reward may be an all expenses paid trip to the Encore resort & casino in Las Vegas. Another example may be promotional credits for use at a designated gaming facility. Each of these rewards may be sponsored by the respective casino operator, or the community game website provider may offer such rewards as part of its player incentive program.

In one or more embodiments, a casino operator may be able to program player rewards through a user console (not shown, similar to a cash/ticket voucher kiosk or ATM) connected to host server 1907 whereby a player may enter the player's community game website account information onto the user console and request promotional credits or some other award made available by the casino operator. In such case, such rewards may automatically be applied to a player's account associated with the casino operator or may be obtained at a player window located at the operator's facility.

Figure 20:
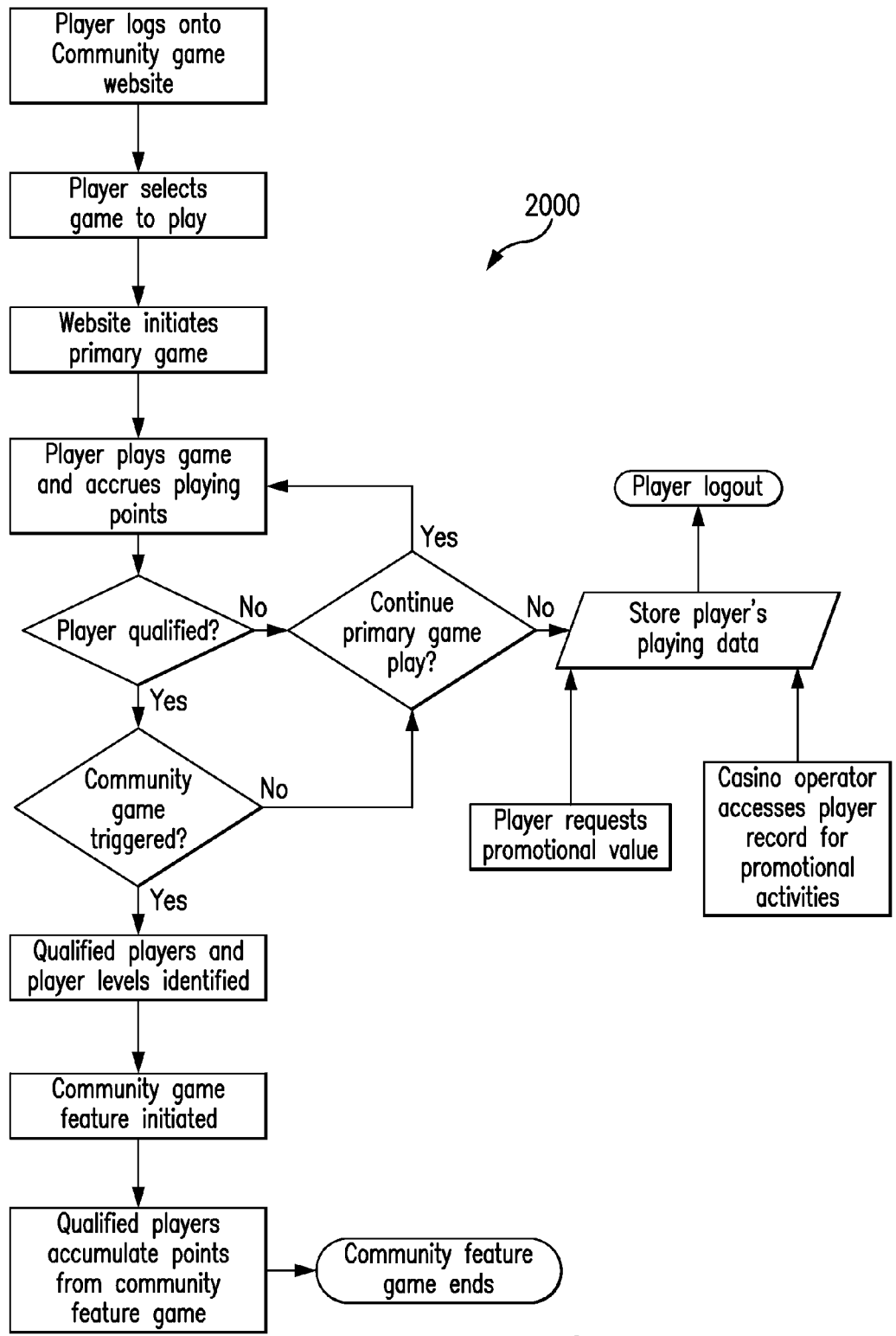
FIG. 20 illustrates an example flowchart of a web-based community game process in accordance with one or more embodiments

Referring to FIG. 20, an example flowchart of web-based community game process 2000 is shown in accordance with one or more embodiments wherein a player may log into community game website 1915 (FIG. 19) through personal computer (PC) 1931 or wireless device 1933 (such as an Apple iPhone® or iPad®). By example, a player may log into Community Game website from home PC/wireless phone, etc., and the player is provided points or virtual dollars to play Primary Game. The player then proceeds to play the Primary Game and accumulates points to qualify for the community feature game. Once qualified, the player may accumulate additional points to increase player level, such as to earn additional community feature game player or launch opportunities, or, to increase a multiplier level from one and higher (which may be used to multiply a community feature game award). When the community feature game is triggered the player, the qualified players and their respective level are identified by the system as necessary, and the community game feature is initiated for the qualified player or players. The player then plays the community feature game for additional points and may accumulate awards redeemable through the website or at casino site [e.g. promotional credits applied to a patron account when player identifies them self and opens player account]. The website stores the player information including accumulated points. This website information may be accessed by a networked casino site when the player identifies them self at the casino site (e.g., at a player desk), and corresponding promo credits may be applied to the casino patron account. The player may then request this promotional value for use in obtaining goods and services or discounts for goods and services.

In another example of an alternative embodiment, gaming machines 103 as contemplated herein may be configured as Class II gaming machines. In the case of Class II gaming devices, the overall structure of the various devices as discussed above is essentially the same with the major difference being the method of determining the game outcome. Commonly, Class II gaming devices utilize the game of bingo as the basis for determining a winning outcome where the ball draw is performed remotely by a network or central determination server (alternative games may be used for determining game outcomes, such as through a lottery drawing of a finite set of numbers, if permitted by the licensing jurisdiction). Class II gaming systems are commonly referred to a central determination systems wherein pools and sub-pools of game outcomes are determined by a central server (or gaming device) and distributed amongst a set of networked gaming devices. The distribution step may be on demand, such as when a gaming device receives a game request, or sets of game outcomes may be distributed to the various networked gaming devices in which case the game processor of the requesting gaming device may select a game outcome from the set of game outcomes, such as by using an RNG or other selection process.

Additionally, Class II gaming devices, such as a bingo-based gaming device may have multiple displays, such as are shown in FIG. 8 wherein one of the displays, such as display 803, may be used to display one or more electronic bingo cards and one or more ball drawings after a game has been initiated in accordance with the game outcome that has been provided to the gaming device by a central determination server (such as server 1923 in FIG. 19). In the case, as in FIG. 8, where the primary display 107 comprises a set of reels, game processor 901 (FIG. 9) may convert the centrally-determined game outcome to a corresponding value outcome of the reel-based game as shown in FIG. 8 and operates the reel-based game as described above and with respect to those figures. (In another embodiment, the central determination server may perform the conversion and send the corresponding reel-based game outcome and bingo-based (central determination-based) outcome). Similarly, as described above, the player may wager a side bet to qualify for the community game. Once the community game is initiated, play may commence in the same manner as described above with respect to FIGS. 2-6, except that the RNG operation of determining the feature game winners and placement may be performed by a central determination server.

In another example alternative embodiment, the primary wagering game presented to the player and displayed, such as on display 805, may be a video poker, blackjack, roulette or other video table, card, or wagering game.

In one or more embodiments, the community game as described above may be implemented with progressive prizes as opposed to fixed multiplier awards. For example, instead of multipliers associated with each place in the feature game, progressive values of graduated amounts may be associated with each place. Each time the player qualifies to make another bet (e.g. Bet Selection Bonus), the player may be provided a multiplier, e.g. 5×, 10×. When the player qualifies a second or more times, the multiplier may be additive to a prior selections; for example, 5×+5×=10× such that the player's award following the feature game may be the progressive value associated with the feature game participant selected by the player multiplied by the multiplier (in this case a multiple of ten times the base progressive value).

In the example race-type feature game, the award associated with a place in the feature game may be a fractional multiple of the base amount in a progressive pool. The progressive pool may be generated in various ways including an initial corpus (seed) value applied by the casino operator, plus an accumulation of the side bets during a selected period associated with the community feature game, or, a percentage of the total wagers or hold amount during a selected period from the respective gaming machines in a bank associated with the community or stand-alone feature game, or a combination thereof. The selected period, for example, may be the period between a previous and a current play of the community feature game. A percentage, which may be the entire amount, of any remainder in the progressive pool following play of the community feature game may be rolled-over to a subsequent community feature game pool.

In one or more embodiments, the active element of the community feature game may comprise a wide variety of objects associable with a field, space, or surface (game surface) to achieve a predictable outcome by ascertaining a value for each of the variables required to model the association of the object with the game surface. For example, in the case specifically described herein, the active element comprises a car or defined object launched onto a surface or course and awards acquired based on the path traversed which is predictable by generating a mathematical model, fixing or specifically defining each of the elements of the game surface. Another example active element may include a rocket or projectile launched from a defined location at a selected launch angle and velocity where the path may be into space with a variety of celestial objects, obstacles, and/or targets which may garner awards for the player based on performance of the rocket. In another example, a rocket may be launched from one location to reach another location whereby the player may gain an award based on the proximity of the launched rocket to the target location at impact. In other examples, the feature game may comprise an obstacle course traversed by a field of runners or a steeple chase traversed by a field of horse and riders. Other objects that may be modeled on various fields include planes and boats.

In one or more embodiments, the spectrum of feature game outcomes may be defined by a function with at least one player selectable or determinable variable and with at least one variable randomly or pseudo-randomly determinable by the feature game controller. For example if the feature game outcomes are defined by a function $f(x,y)$, the player may select a value for 'x' within a range of possible values. For each possible 'x', a sub-table (set) may be generated of possible 'y' values, each possible 'y' having an associated probability of occurrence and award. In another example, the feature game may be defined by a function $f(x, y, z, \ldots)$, the player may be provided an opportunity to select a value for one or more variables but not all of them, and the remaining un-selected one or more variables may randomly or pseudo-randomly be determined from a sub-table generated with the player-selected values for the selected variables wherein the sub-table includes a set of possible values for the unselected variables, along with an associated probability of occurrence and award for each possible combination of values. As shown above in the example tables, the range of values may be limited to a range or fixed and various undesirable value combinations eliminated.

Figure 21:
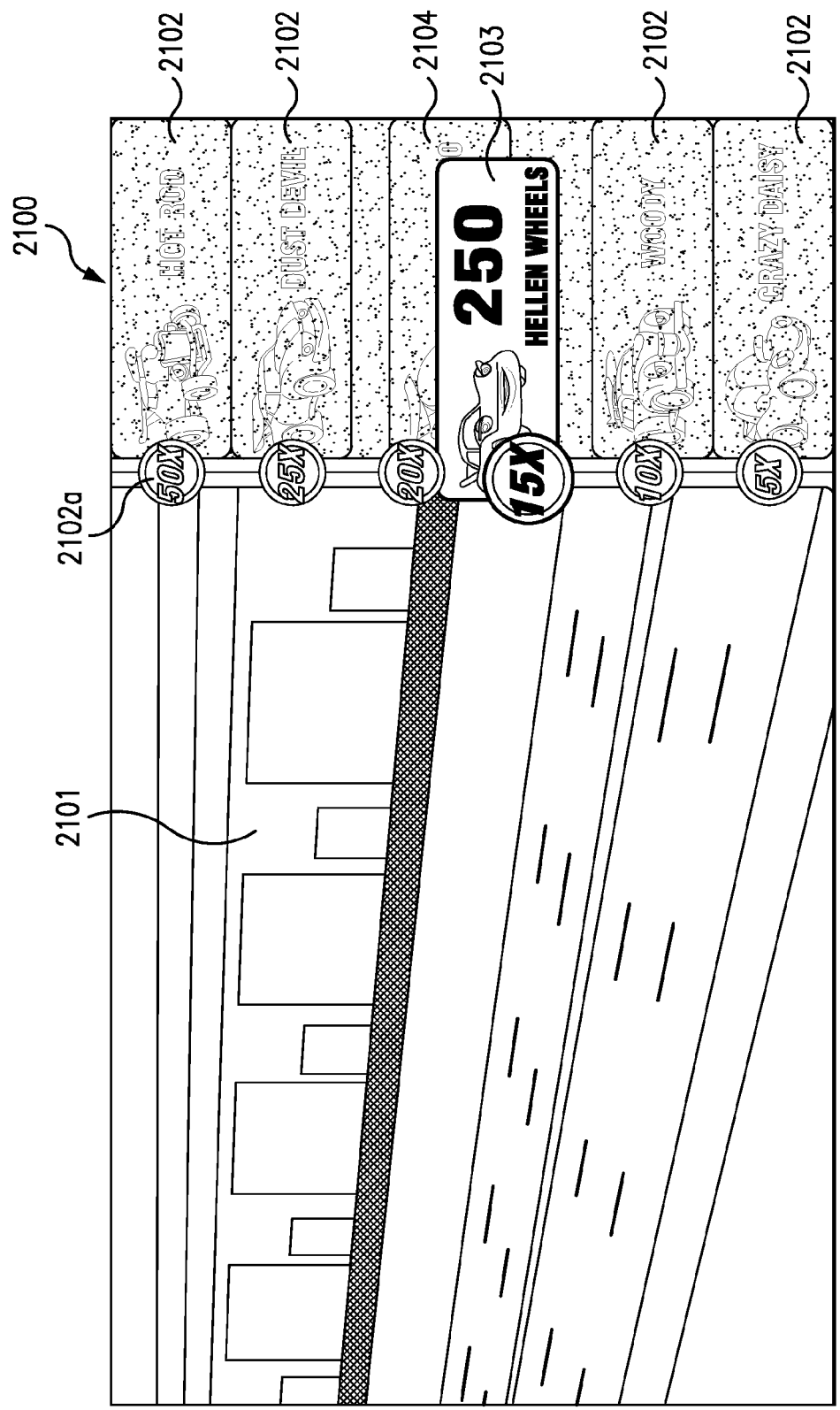
FIG. 21 illustrates an example screenshot showing a position switch between two adjacent virtual participants in and example feature game.

FIG. 21 shows an example position graphic (leader board) 2100 for a virtual competition (in this case, a car race) shown in a competition graphic 2101 in a separate area of a display device. This example position graphic 2100 includes six different positions 2102, each associated with a multiplier value 2102a. All of the positions 2102 show a respective virtual participant marker except for the positions corresponding to 15× and 20×, which are shown in the midst of a position switch. One of the virtual participant markers involved in the position switch, the virtual participant marker labeled 2103, is highlighted to indicate that the player for which this graphic is produced has placed a bet on the virtual participant corresponding to the marker. The other marker for the virtual participant involved in the position switch is labeled 2104 in the figure. This position switch in position graphic 2100 corresponds to the virtual participant indicated by marker 2103 having overtaken the virtual participant indicated by marker 2104 in the virtual competition being simultaneously displayed by competition graphic 2101. As is apparent by marker 2103 being shifted somewhat to the left as compared to marker 2104, the markers do not simply trade places in this embodiment. Rather, in order to provide a more exciting and visually interesting display, one of the markers (in this case advancing marker 2103) is shown as swinging out partially around the retreating marker 2104, while marker 2104 simply falls straight back towards the position occupied by marker 2103 immediately prior to the position switch. Although not shown in FIG. 21, at the completion of the position switch, marker 2103 will be at the position occupied by marker 2104 immediately before the position switch, and marker 2104 will be at the position occupied by marker 2103 immediately before the position switch.

It will be appreciated that numerous variations are possible for showing a position switch between adjacent virtual participant markers in position graphic 2100. For example, the advancing marker might shift over somewhat to the right rather than the left as it advances to the higher position in the position graphic 2100. Also, it could be the retreating marker which slides out partially to one side or the other during the position switch, or both markers could slide out in opposite directions. Also, the various position markers in the position graphic 2100, such as markers 2103 and 2104, may be shown as jostling from side to side and up and down in their various positions to mimic jostling between virtual participants in the virtual competition shown in competition graphic 2101. As will be discussed further below in connection with FIG. 22, the position switches shown in position graphic 2100 may be made in real-time to correspond to the various virtual participant positions in competition graphic 2101.

Figure 22:
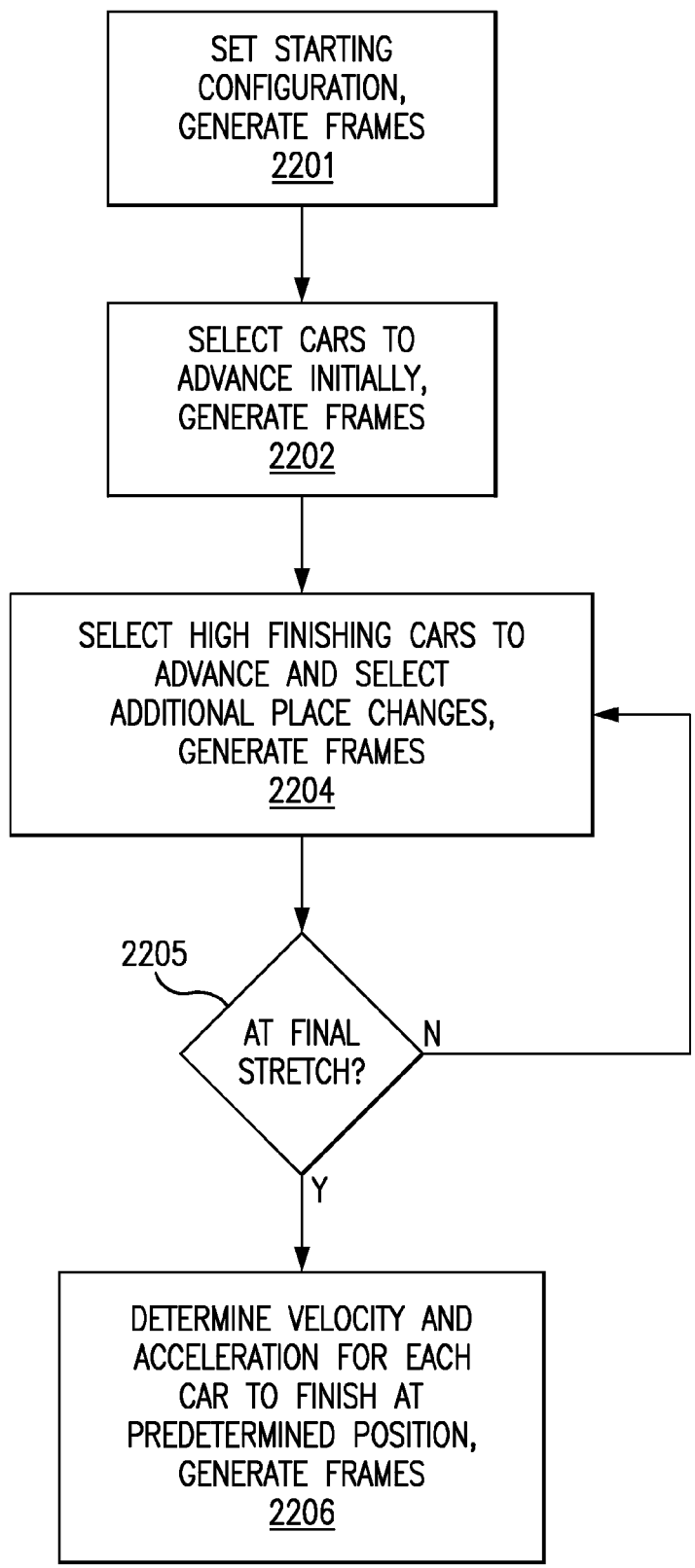
FIG. 22 illustrates an example flowchart of a process for generating a feature game which includes a virtual competition for a field of virtual participants.

Referring now to FIG. 22, generating both the competition graphic (such as graphic 2101 partially shown in FIG. 21) and position graphic (such as graphic 2100 in FIG. 21) may be performed in a single process based on the desired positions of the various virtual participants at different points in the virtual competition. The illustrated process includes at block 2201, setting a starting configuration and generating frames to show the desired display of the competition. The starting configuration here is simply a configuration or list of virtual participants. The virtual participants may be arranged randomly or otherwise, and the position on the virtual racetrack may initially correspond to the relative positions of the markers in the position graphic.

In process block 2201, as with the other process blocks shown in FIG. 22, "generate frames" refers to a process of generating the various frames that will be displayed sequentially to show the desired video animation. At the start of a given competition graphic, it will be appreciated that all of the virtual participants may be lined up along a starting line or on a starting grid and may be relatively stationary. Although the competitors may be relatively stationary at this point in the virtual competition, frames may be generated show relatively subtle movements in the competition graphic, such as flags waiving in a breeze, or perhaps in the case of a virtual car race, vibrations in the different competitor vehicles as their engines rev.

As shown at process block 2202 in FIG. 22, the process next includes selecting one or more virtual participants (cars in this case) to advance initially from the starting position relative to the other virtual participants. This selection may be done randomly or in any suitable manner. However, the number of virtual participants to advance initially may be limited to a relatively small number (which may be predefined) so as to limit the number of position switches shown on the position graphic part (e.g. position graphic 2100 in FIG. 21) of the overall feature game graphic display. Regardless of the number of virtual participants selected to advance relative to the remainder of the field, the resulting advancement or advancements determine the relative positions of the virtual participants both in the competition graphic (e.g. 2101 in FIG. 21) and the position graphic (e.g. 2100 in FIG. 21). The method includes generating additional frames to display the competition graphic and position graphic consistent with these relative positions of virtual participants.

As shown at process block 2204, the illustrated method includes next selecting the high finishing virtual participants (cars) to advance in the field. It will be noted that this selection of high finishing virtual participants requires that the finishing positions be known at least at this point in the process. Some implementations may start the video graphic generation process with the finishing positions known (randomly determined, or otherwise), while other implementations may be supplied with the finishing positions after the start of the virtual competition and before the finishing positions are needed at block 2204. In any event, the order in which the high finishing virtual participants are selected at process block 2204 may or may not be random. As with process blocks 2201 and 2202, process block 2204 indicates that video frames are generated to display the competition graphic and position graphic consistent with the selected relative position changes. Thus the place changes occasioned by these selections shown at process block 2204 will be shown both in the competition graphic and the position graphic.

It will be noted that process block 2204 also indicates that additional place changes are selected. This indication in the process block refers to an implementation in which additional random "noise" virtual participant position changes are included in addition to the other position changes to help produce a more realistic animation.

Whether random position or place changes are made according to process block 2204, the process continues with these selections until some point in the competition. FIG. 22 shows the recurrent nature of the selections at process block 2204 by the logical loop from decision block 2205. If the point in the virtual competition is reached, the process proceeds to process block 2206, otherwise the process loops back to block 2204. It should be noted that although the point at which the process progresses to block 2206 is shown as a fixed point (the start of the final stretch in the race) in FIG. 22, this transition point in the virtual competition, may be randomly determined.

As indicated at process block 2206, the illustrative process includes determining the final velocity and acceleration for each virtual participant to reach the finish in the predetermined position (predetermined by this point in the graphic generation process). The process then includes generating video frames consistent with the determined velocities and accelerations, and the relative positions at the time the step at process block 2206 begins. This generation of additional frames for the video animation completes the video animation of the virtual competition through to the point at which the virtual participants cross a finish line.

At one or more points in the process shown in FIG. 22, or throughout the process, the number of virtual participants that change position may be constrained to some maximum number. For example, the entire process or at least a portion of the process may be constrained to showing no more than two virtual participants changing position with an adjacent virtual participant at a given time. The maximum number of concurrent place switches may be constant throughout the process or may vary. In any event, the maximum number of concurrent place switches allows the virtual competition to remain dynamic and interesting while preventing the position graphic from appearing too busy.

It will be appreciated that process blocks 2202, 2204, and 2206 represent different processes performed at different times of the virtual competition being graphically rendered. The times for which the various process steps may be executed may vary from one virtual competition to the next. For example, the processing indicated at process block 2202 may generate the frames for the first 1-4 seconds of the virtual competition, and the process indicated at process block 2204 may begin immediately following this initial period ends. This loop produced by decision block 2205 may continue for a uniform period of time for each virtual competition or (as indicated by FIG. 22) a variable period of time dictated by when the virtual participants reach a certain point in the virtual competition.

The example process shown in FIG. 22 represents a complete process of generating the various video frames which go into the animated video representing the feature game. This process may be performed for each virtual competition to be displayed and at each separate gaming system component displaying the virtual competition. For example, the feature game represented by the virtual competition may be a community feature game. In this case each gaming machine participating in the community feature game (e.g., by virtue of a player at that gaming machine qualifying for the community feature game) may separately perform the process described in FIG. 22 to generate substantially the same graphic display at each respective gaming machine. The same process may be performed to produce the graphic display signal necessary to drive a shared or community display device, such as the overhead display shown at 101 in FIG. 1. In one embodiment a seed value for a given feature game play is generated at a community feature game controller (a data processing device or simply "processing device") and this seed value is communicated to each gaming machine and other device in the community gaming system which must produce the feature game represented by the virtual competition. The receiving community gaming component, that is, a processing device at the given component then generates all necessary information for controlling the graphic generation process from the seed value. The video frames may be rendered in real-time at each processing device and displayed essentially concurrently at each respective display device used to show the video animation. Time based updates may be used to keep all of the processing devices and displays relatively in sync. In this arrangement all of the computations are done with respect to a real world timer, so each processing device knows what to display as each unit of time passes. If a processing device is running slowly for some reason, the display it drives will still be in sync with the others, but the graphic will look relatively choppy since the driving processing device has to skip frames to stay on time.

It will be appreciated that all of the processing indicated in FIG. 22 may be performed by one or more suitable data processing devices (which each may be a suitable microprocessor or any other suitable type of device) located in the gaming system. For example, one or more data processing devices at a given gaming machine in the system may perform the process shown in FIG. 22 under the control of suitable program code executed by the data processing device. The result of the processing is a driving signal in suitable format to drive the desired display device or devices to display the intended feature game animated graphic.

For an individual gaming machine the community feature game graphic may be referred to a local graphic since it is intended to be displayed locally at that gaming machine. Where the community feature game is to be displayed on a public or shared display device such as device 101 in FIG. 1, the community game feature graphic may be referred to as a shared community feature game graphic. It will be appreciated that although the basic animation will generally be the same as between all local community feature game graphics and shared community feature game graphics, there may be small differences suited to the intended audience. For example, a local community feature game graphic may (as described above in connection with FIG. 22 and elsewhere) include highlighted virtual participant markers (e.g., marker 305 in FIG. 3) for virtual participants on which the local player at that gaming machine has placed a bet. All virtual participant markers may be highlighted for a given shared community feature game graphic.

Figure 23:
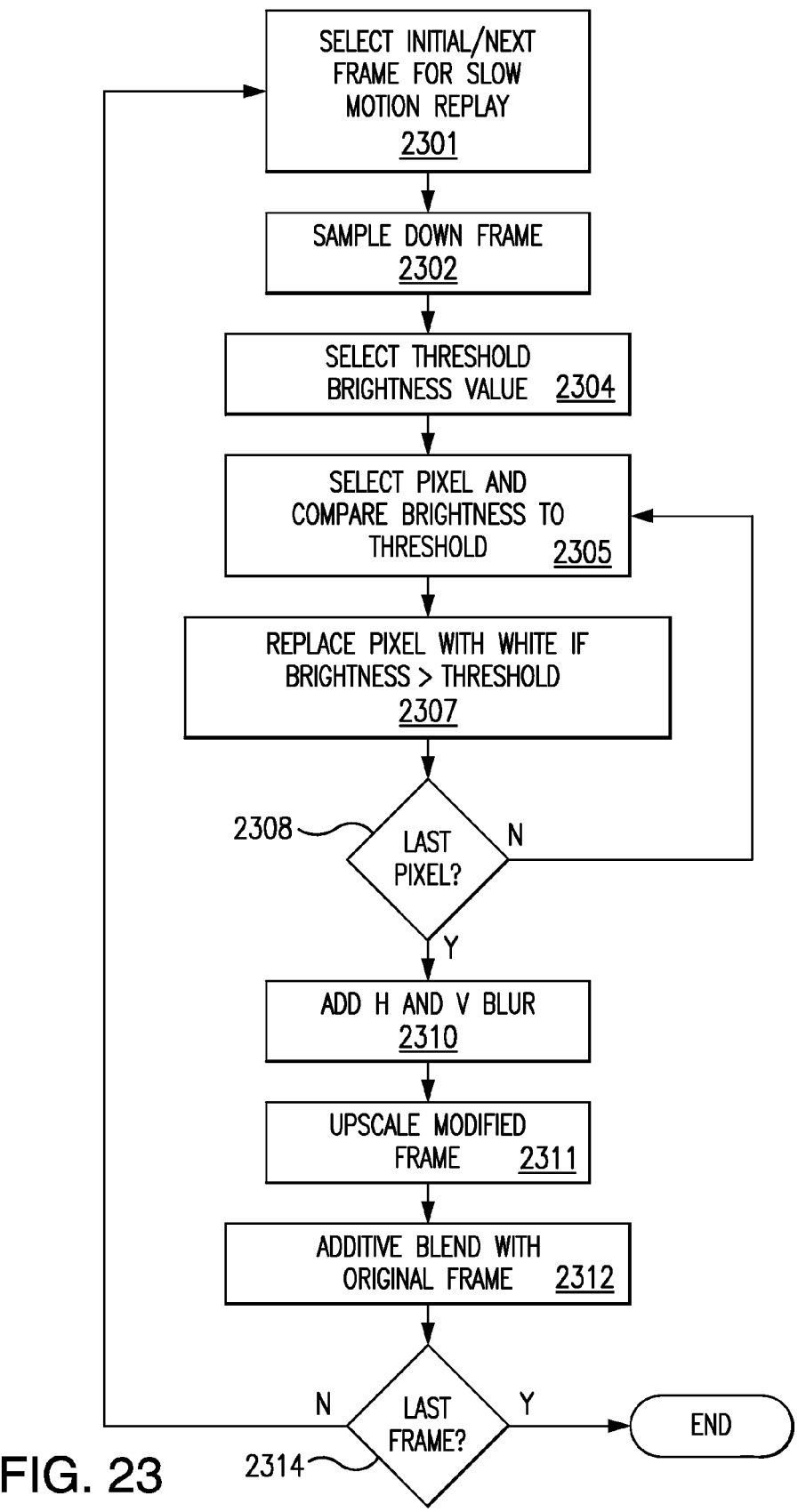
FIG. 23 illustrates an example flowchart of a process for generating a slow motion replay of the finish of a virtual competition.

In some embodiments of the feature game comprising a virtual competition such as the car race described above, an additional animation showing the finish or other part of the competition in slow motion may be added to enhance entertainment value and to clearly show the competition results. FIG. 23 shows a process which may be applied to produce a slow motion replay. This illustrated process relies on starting with an original frame which has been generated for the animation video representing the virtual competition. This original frame may be saved from the rendering done to produce the original video animation, or may be regenerated for the slow motion replay using the very same process used to produce the frame for the original, regular motion video animation of the virtual competition.

Referring to process block 2301 of FIG. 23, the example slow motion process includes first selecting an original frame to be processed to produce a corresponding slow motion frame. At the start of the slow motion replay processing, it is necessary to select a first or initial frame that will start the slow motion replay graphic. This selection may be according to some rule for each slow motion process, such as the frame at 3 seconds in real-time before the finish or other event to be shown in slow motion. Any suitable selection process may be used for selecting the initial frame, including a process that tailors the selection to the particular slow motion replay to be produced. As will be described further below, the process shown in FIG. 23 is a loop process which is performed for each corresponding original frame showing the original real-time animation of the virtual competition. For each execution of process block 2301 after the first execution, the frame selected for processing may be the next frame in the original animation.

After selecting a given frame for processing, the process shown in FIG. 23 includes sampling down the frame to reduce the pixel count in the frame as shown at process block 2302. This sampling down may include more than one process. For example, the sampling down indicated at block 2302 may include an initial sampling down by one quarter, and then a sampling down of the resulting frame again by one quarter. In any event, the resulting sampled down frame includes far fewer pixels for processing in the rest of the process. It will be appreciated that although the sampling down is included in the illustrated process, this step may not be required for some implementations depending upon the nature of each original frame and the available processing power.

The illustrated process further includes selecting a threshold brightness value as indicated at process block 2304, and then comparing a selected pixel in the sampled-down original frame with the threshold brightness value as indicated at process block 2305. As shown at process block 2307, if this comparison shows that the brightness of the respective pixel is greater than the selected threshold, then the pixel is replaced with a suitable color to produce a camera flash effect in the resulting slow motion replay. For example, pixel may be replaced with white or an off-white color. As indicated by the loop back from decision block 2308, this pixel comparison and conditional replacement may be performed on a pixel-by-pixel basis across the entire frame being processed.

Once the last pixel of the frame being processed is compared and replaced according to the given replacement rule, the illustrated process proceeds to introduce both a horizontal (H) and vertical (V) blur to the frame as indicated at process block 2310. The resulting modified frame is then upscaled as necessary back to the original quality as shown at process block 2311. For the given frame being processed, the illustrated process finally includes blending the modified frame created according to the previous process steps with the original frame according to a blending rule. This step shown at process block 2312 may use any suitable blending rule. For example, the blending rule may comprise a 50/50 blend of pixel properties on a pixel-by-pixel basis or any other suitable property blending rule to produce the desired result. The resulting frame from the process applied according to FIG. 23 is then ready to be displayed to produce the desired slow motion graphic. It will be appreciated that the slow motion display slows time relative to the real-time animation, and thus requires additional frames to be added to produce a smooth slow motion animation.

As indicated by decision block 2314, the entire process starts again with the next frame in the original animation until the last original frame is processed. This last original frame may not be the final frame of the original animation, but may be some other frame at a point in the original animation where the slow motion replay is to end.

In one embodiment, in each loop through the process, the threshold value selected at block 2304 is incremented until some final value is reached. This process of increasing the number of white pixels as frames advance has the effect of producing a "bloom" of the replaced color as the final modified frames are displayed, and mimics the increasing brightness of a camera flash. At some point in the desired slow motion animation it may be desired for the frames to gradually return to their original condition as in the optical recovery from a camera flash. Thus the process at block 2304 may include selecting a brightness threshold value lower than the immediately preceding value. It will also be appreciated that the camera flash effect produced according to the pixel replacement part of the process shown in FIG. 23, may not begin at the start of the slow motion replay. For example, it may be desirable to show the leading cars approaching the finish line in regular slow motion, and then start the camera flash effect just when the lead car (virtual participant) reaches the finish line. Thus a process according to FIG. 23 may apply a very high threshold value to prevent pixel replacement for some frames, or may simply skip the pixel replacement steps for some frames, until the desired camera flash effect is desired. Even where no pixel replacement is used for a given frame for the slow motion replay, it may still be desirable to add a horizontal and/or vertical blur as at block 2310, although the sampling down and upscaling for the frame may not be required, and the blending may also not be required.

The processing required to produce the slow motion replay frames according to FIG. 23, or some other suitable process, may be performed at any suitable data processing device in the gaming system. For example, for producing a slow motion display graphic input signal for one or more display devices at a gaming machine, the processing may be performed at a suitable data processing device at the gaming machine, such as the processing device (which may be a microprocessor) representing the game controller for the gaming machine (901 in FIG. 9), or a dedicated graphics processor (GPU) associated with the game controller of the given gaming machine. The processing may be performed by the suitable data processing device or devices under the control of program code executed by the data processing device or devices.

Although the above examples predominantly discuss the slow motion replay produced according to FIG. 23 in terms of a virtual competition comprising a race, the same slow motion generating arrangement may be used for any animated video sequence, virtual competitions or other virtual events.

As discussed above, where the game represented by the virtual competition is a feature game, the feature game may be implemented so as to interrupt play in a primary game at a given gaming machine. In the case of an interruption of play at a gaming machine, the state of the gaming machine at the time of the interruption may be saved and stored so that the primary game may be resumed once the feature game is completed. Some primary games may include scripted plays in which some number of plays are awarded to the player and the result of each play is predetermined to produce a give result. For example, a primary game may include awarding some number of free spins to a player based on some free spin qualifying result, event, or other parameter. In the case of a primary game in which plays are played according to a script, the step of saving the primary game state may include saving an identifier for the last completed play of the script. This allows the game controller for the given gaming machine to resume the script at the correct position to show the remaining scripted plays.

Referring generally to the forgoing description and the following claims, as used herein the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described example embodiments are intended to illustrate the principles of the invention, but not to limit the scope of the invention. Various other embodiments and modifications to these preferred embodiments may be made by those skilled in the art without departing from the scope of the present invention.

For example, many casinos include a backend server system that is network connected to each of the gaming machines on the floor. One of the backend servers may be programmed to operate as the community game server and connect to a bank of gaming machines 103 and overhead display 101 as shown in FIG. 1. Thus a backend server may be programmed to initiate the community game feature and control the respective bank of gaming machines 103 and overhead display 101 during the community game feature presentation.

The invention claimed is:

1. A method of operating a feature game, the method including the steps of:
    following an initiation of one or more plays of a primary game, initiating play of the feature game at a gaming machine;
    providing a player of the primary game an opportunity to select at least one virtual participant from a field of virtual participants for the feature game, and receiving a player selection of at least one virtual participant through the gaming machine;
    during the feature game, producing a competition graphic showing a virtual competition between the field of virtual participants;
    displaying a replay of a portion of the virtual competition in slow motion; and
    determining an outcome of the feature game; and
    wherein displaying the replay of a portion of the virtual competition includes sampling down frames for the replay to produce down sampled frames.

2. The method of claim 1 wherein displaying the replay of a portion of the virtual competition includes adding a horizontal blur and a vertical blur to one or more of the down sampled frames.

3. The method of claim 1 wherein displaying the replay of a portion of the virtual competition includes upscaling the down sampled frames to produce a number of restored frames.

4. The method of claim 1 wherein displaying the replay of a portion of the virtual competition includes modifying a number of original frames for the portion of the virtual competition and performing a pixel-by-pixel additive blend for each respective modified frame with the corresponding original frame for the virtual competition finish to produce a respective final frame for the portion of the virtual competition in slow motion.

5. The method of claim 1 wherein displaying the replay of the portion of the virtual competition includes defining an expanded time frame for a period defining the portion of the virtual competition finish and rendering each frame for the period defining the portion of the virtual competition in that expanded time frame.

6. A method of operating a feature game, the method including the steps of:
    following an initiation of one or more plays of a primary game, initiating play of the feature game at a gaming machine;
    providing a player of the primary game an opportunity to select at least one virtual participant from a field of virtual participants for the feature game, and receiving a player selection of at least one virtual participant through the gaming machine;
    during the feature game, producing a competition graphic showing a virtual competition between the field of virtual participants;
    displaying a replay of a portion of the virtual competition in slow motion;
    simulating occurrence of flash photography in the replay of the portion; and
    determining an outcome of the feature game;
    wherein simulating occurrence of flash photography in the replay comprises displaying the replay of a portion of the virtual competition includes selecting a brightness threshold value for at least one frame to be processed.

7. The method of claim 6 wherein simulating occurrence of flash photography in the replay further comprises comparing pixel brightness for each of a number of different pixels making up a given frame to the selected brightness threshold value and replacing the respective pixel making up the given frame with a white pixel if the pixel brightness for that respective pixel bears a predetermined relationship to the selected brightness threshold value.

8. The method of claim 7 wherein simulating occurrence of flash photography in the replay further comprises selecting an increasing brightness threshold over a number of frames to be processed.

9. A gaming apparatus including:
    a player interface enabling a player to initiate one or more plays of a primary game and providing the player an opportunity to select at least one virtual participant from a field of virtual participants of a feature game;
    a processing device adapted to, over a course of the feature game, produce a competition graphic signal and a slow motion replay graphic signal; and
    one or more display devices providing a display field to (i) display a competition graphic in response to the competition graphic signal, the competition graphic showing a virtual competition between the field of virtual participants, and to (ii) display a slow motion replay graphic in response to the slow motion replay graphic signal, the slow motion replay graphic showing a segment of the virtual competition; and
    wherein producing the slow motion replay graphic signal includes sampling down frames for the slow motion replay to produce down sampled frames.

10. The apparatus of claim 9 wherein producing the slow motion replay graphic signal includes simulating occurrence of flash photography in the slow motion replay graphic.

11. The apparatus of claim 10 wherein simulating occurrence of flash photography in slow motion replay graphic includes selecting a brightness threshold value for at least one down sampled frame to be processed.

12. The apparatus of claim 11 wherein simulating occurrence of flash photography in the slow motion replay graphic further includes comparing pixel brightness for each of a number of different pixels making up a given down sampled frame to the selected brightness threshold value and replacing the respective pixel making up the given down sampled frame with a white pixel if the pixel brightness for that respective pixel bears a predetermined relationship to the selected brightness threshold value.

13. The apparatus of claim 12 wherein simulating occurrence of flash photography in the slow motion replay graphic further includes selecting an increasing brightness threshold over a number of down sampled frames to be processed.

14. The apparatus of claim 10 wherein producing the slow motion replay graphic signal includes adding a horizontal blur and a vertical blur to one or more of the down sampled frames.

15. The apparatus of claim 10 wherein producing the slow motion replay graphic signal includes upscaling the down sampled frames to produce a number of restored frames.

16. The apparatus of claim 9 wherein producing the slow motion replay graphic signal includes modifying a number of original frames for the segment of the virtual competition and performing a pixel-by-pixel additive blend for each respective modified frame with the corresponding original frame for the segment of the virtual competition to produce a respective final frame for the segment of the virtual competition in slow motion.

* * * * *